US012783713B2

(12) United States Patent
Krishna

(10) Patent No.: US 12,783,713 B2
(45) Date of Patent: Nov. 3, 2026

(54) RISK MANAGED DATA SYSTEM AND ASSOCIATED METHOD

(71) Applicant: KPMG LLP, New York, NY (US)

(72) Inventor: Sreekar Krishna, Phoenix, AZ (US)

(73) Assignee: KPMG LLP, New York, NY (US)

( * ) Notice: Subject to any disclaimer, the term of this patent is extended or adjusted under 35 U.S.C. 154(b) by 47 days.

(21) Appl. No.: 18/901,948

(22) Filed: Sep. 30, 2024

(65) Prior Publication Data

US 2025/0111075 A1 Apr. 3, 2025

Related U.S. Application Data

(60) Provisional application No. 63/586,019, filed on Sep. 28, 2023.

(51) Int. Cl.
*G06F 21/62* (2013.01)

(52) U.S. Cl.
CPC ................................ *G06F 21/6227* (2013.01)

(58) Field of Classification Search
None
See application file for complete search history.

(56) References Cited

U.S. PATENT DOCUMENTS

| | | | | |
|---|---|---|---|---|
| 7,069,256 | B1 * | 6/2006 | Campos | G06F 16/2457 706/16 |
| 11,556,815 | B1 * | 1/2023 | Stave | G06N 5/04 |
| 11,899,670 | B1 * | 2/2024 | Bhagat | G06F 16/22 |
| 2023/0222454 | A1 * | 7/2023 | Cella | B25J 9/1682 705/28 |
| 2024/0143612 | A1 * | 5/2024 | Bigdelu | G06F 16/2425 |
| 2024/0362208 | A1 * | 10/2024 | Naufel | G06F 16/243 |
| 2025/0168647 | A1 * | 5/2025 | Zoulias | H04W 12/121 |

* cited by examiner

*Primary Examiner* — Trang T Doan
(74) *Attorney, Agent, or Firm* — Nelson Mullins Riley & Scarborough LLP; Anthony A. Laurentano

(57) ABSTRACT

A system and method for controlling data access by providing a first data isolation layer for isolating a user from a data source subsystem by employing a first machine learning model for processing input query data and raw data and for generating first output model data that includes query instructions and responses to the input query data. A second data isolation layer maps metadata to the query instructions to form mapped query data and converts the mapped query data into software tool specific command data corresponding to a software application by employing a second machine learning model for transforming and adapting the mapped query data into a format compatible with a target software tool. A third data isolation layer can be employed for processing data access guideline data and data access policy data and for generating a set of recommendations for accessing the data.

24 Claims, 4 Drawing Sheets

RISK MANAGED DATA SYSTEM AND ASSOCIATED METHOD

RELATED APPLICATION

The present application claims priority to U.S. provisional patent application Ser. No. 63/586,019, filed on Sep. 28, 2023, and entitled RISK MANAGED DATA SYSTEM AND ASSOCIATED METHOD, the contents of which are herein incorporated by reference.

BACKGROUND OF THE INVENTION

The present invention relates to data access and security systems, and particularly relates to data access and risk management system that can mitigate potential threats and vulnerabilities in digital environments, while concomitantly managing access to the data.

In today's interconnected and technology-driven world, data breaches, cyberattacks, and information leaks have become prevalent concerns for enterprises, such as individuals, businesses, and organizations, when managing internal data systems. To counteract these threats, various data security and risk management systems have been developed and deployed. Conventional systems can involve the use of rule-based approaches, signature-based detection, anomaly detection systems, and encryption techniques, aiming to protect sensitive data and identify abnormal activities within digital data systems. The conventional systems, while effective to a certain extent, still face limitations in adapting to rapidly evolving attack vectors, sophisticated intrusion strategies, and the need for employees to access sensitive data.

Further, enterprises also need to manage access to the data by their employees and consultants to ensure that the data is not inadvertently changed or altered and is not inadvertently disseminated or stored in unsecure locations. The secure and managed access to sensitive data is thus a concern for enterprises across industries. Conventional data access management systems have been developed and employed to regulate the permissions and privileges granted to users interacting with digital resources. These conventional systems typically rely on predefined access policies, role-based access control (RBAC) methods, and attribute-based access control (ABAC) models to enforce data security. While conventional systems have proven partially effective in managing data access, they still encounter challenges when it comes to handling complex access scenarios, dynamic user behavior, and the ever-expanding volume of data. Traditional access management systems often struggle to adapt to nuanced user needs, potentially resulting in either overly permissive access or unnecessary restrictions, both of which can compromise data security and hinder operational efficiency. Further, the conventional systems may not accurately identify changes in user behavior or deviations from established patterns, which can indicate unauthorized access. As the volume and complexity of data grow, manual administration of access rights becomes increasingly challenging, and policy enforcement can become inconsistent.

SUMMARY OF THE INVENTION

The present invention is directed to a data access and risk management system that employs multiple layered machine learning models forming discrete data isolation layers that help manage and monitor access to system data. The system receives a data query from a user, processes the query using one or more machine learning algorithms, maps the resultant query data to system metadata, converts the query data into tool specific command data, and then manages access to the system data in the data sources identified in the metadata and command data. The data access and risk management system can hence retrieve selected data results without identifying the data source or allowing user access to the data source, thus preserving data security and integrity.

The present invention is directed to a computer-implemented data access and risk management system that includes a processor and a non-transitory memory having instructions configuring the processor to perform a series of actions. The actions can include forming a first data isolation layer for isolating a user from a data source subsystem, the first data isolation layer employing a first machine learning model for processing input query data received from a query control unit and raw data received from the data source subsystem and for generating first output model data that includes query instructions as well as one or more responses to the input query data based on the input query data and the raw data; forming a second data isolation layer having a mapping and conversion unit for mapping metadata from the data source subsystem to the query instructions to form mapped query data and for converting the mapped query data into software tool specific command data corresponding to one or more software applications of the data source subsystem, where the command data corresponds to selected types of information from one or more selected data sources in the data source subsystem and where the mapping and conversion unit employs a second machine learning model for transforming and adapting the mapped query data into a format compatible with one or more target software tools associated with specific data sources in the data source subsystem; and forming a third data isolation layer having a risk mitigation engine for processing data access guideline data and data access policy data and for generating, based thereon, a set of recommendations for accessing the data in the data source subsystem. The system can also include a data access verification unit for receiving the software tool specific command data and the set of recommendations and for generating, based thereon, access verification data representative of a data access decision.

The processor can be further configured to train the first machine learning model with a text dataset having a word sequence as an input such that the model learns to predict a next word in the word sequence of the text dataset given a preceding word in the word sequence and given a context of the text dataset, and tune the trained first machine learning model to perform one or more selected tasks by training the first machine learning model on a narrower text dataset and adjusting one or more tuning parameters to perform the selected task. The second machine learning model can be configured to convert the mapped query data into tool specific command data by encoding the mapped query data and then decoding the mapped query data to form the output command data using a transformer architecture. Each of the first machine learning model and the second machine learning model can include a transformer type machine learning model. The processor can be further configured to train the second machine learning model with datasets having pairs of estimated input queries and corresponding software tool-specific commands associated with the data source subsystem to convert the mapped query data into the software tool specific command data. Further, the data access decision includes one or more of granting access to the data, denying access to the data, requesting additional information, and suggesting an alternative action.

The data access verification unit can be configured to verify an identity of the user or software application requesting access to the data in the data source subsystem. The access verification unit comprises an access control checker engine for controlling access to the data in the data source subsystem based on the software tool specific command data and the third model output data and for generating the access control decision. The access control checker engine can be configured to compare the third model output data with one or more user attributes of the user to determine whether the user access to the data in the data source subsystem is granted or denied. The access verification unit further can optionally include a policy checker engine for determining whether the software tool specific command data includes information requesting access to a selected data source in the data source subsystem and determines whether the access request is consistent with one or more data access policies forming part of the set of recommendations in the third model output data. The access verification unit can further include a risk mitigation checker engine that is configured to assess and mitigate potential risks associated with data access by the user and to verify that a user data access request is consistent with the set of recommendations in the third model output data. The risk mitigation checker engine is configured to assign a risk score to the user data access request. The system can further include a data source manager for receiving the access verification data and parsing and translating the access verification data into a format that is compatible with one or more of the data sources of the data source subsystem.

The present invention is further directed to a computer-implemented data access and risk management system that includes a data source subsystem for storing data from an enterprise. The data source subsystem can include a raw data collector for aggregating and storing raw data generated by the enterprise, a storage subsystem having a plurality of storage elements for storing the raw data, a metadata collector for collecting metadata generated by the enterprise, and a tool specific query manager. The system further includes a query input unit configured to receive an input query from a user and for generating query data representative of the input query, a first machine learning model for receiving the query data and for generating based thereon first model data including query instructions representative of the query data, and a mapping and conversion unit for receiving the query instructions and metadata from the metadata collector. The mapping and conversion unit includes a mapping unit for mapping the metadata to the query instructions to form mapped query data, and a conversion unit employing a second machine learning model for converting the mapped query data into software tool specific command data corresponding to one or more software applications in the data source subsystem, wherein the software tool specific command data corresponds to selected types of information from one or more selected data sources in the storage subsystem; a risk mitigation engine for receiving and processing guideline data that includes data associated with one or more guidelines for accessing the data in the data source subsystem and policy data that includes data associated with one or more policies for accessing the data in the data source subsystem, wherein the risk mitigation engine includes a third machine learning model for processing the guideline data and the policy data and for generating, based thereon, third model output data representative of a set of recommendations for accessing the data in the data source subsystem; and a data access verification unit for receiving the software tool specific command data and the third model output data and for generating, based thereon, access verification data representative of a data access decision.

The first machine learning model is trained with a text dataset having a word sequence as an input such that the model learns to predict a next word in the word sequence of the text dataset given a preceding word in the word sequence and given a context of the text dataset, and the first machine learning model is tuned to perform one or more selected tasks by training the transformer type machine learning model on a narrower text dataset and adjusting one or more tuning parameters so as to perform the selected task. The metadata collector is configured to transform the metadata into a common schema and to organize the metadata in a structured manner by creating relationships and linkages between different elements of the metadata. The mapping unit is configured to employ predefined mapping rules for mapping the query instructions with the metadata based on one or more selected type of metadata parameters and enrich the query instructions with the mapped metadata to form the mapped query data.

The second machine learning model is configured to convert the mapped query data into tool specific command data by encoding the mapped query data and then decoding the mapped query data to form the output command data using a transformer architecture. Each of the first machine learning model and the second machine learning model comprises a transformer type machine learning model. The second machine learning model can be trained with datasets having pairs of estimated input queries and corresponding software tool-specific commands associated with the data source subsystem so as to convert the mapped query data into the software tool specific command data. The data access decision includes one or more of granting access to the data, denying access to the data, requesting additional information, and suggesting an alternative action.

The data access verification unit can be configured to verify an identity of the user or software application requesting access to the data in the data source subsystem. The access verification unit comprises an access control checker engine for controlling access to the data in the data source subsystem based on the software tool specific command data and the third model output data and for generating the access control decision. The access control checker engine is configured to compare the third model output data with one or more user attributes of the user to determine whether the user access to the data in the data source subsystem is granted or denied. The access verification unit further comprises a policy checker engine for determining whether the software tool specific command data includes information requesting access to a selected data source in the data source subsystem and determines whether the access request is consistent with one or more data access policies forming part of the set of recommendations in the third model output data. The access verification unit further comprises a risk mitigation checker engine that is configured to assess and mitigate potential risks associated with data access by the user and to verify that a user data access request is consistent with the set of recommendations in the third model output data. The risk mitigation checker engine is configured to assign a risk score to the user data access request.

The system further includes a data source manager for receiving the access verification data and parsing and translating the access verification data into a format that is compatible with one or more of the data sources of the data source subsystem, and a storage element for storing one or more of the query data, the mapped query data, and the tool specific command data to form stored data. An analyzer unit can be provided for analyzing and for receiving the stored data. The analyzer unit employs a fourth machine learning model for processing the stored data and for generating report specific output data suitable for use by a reporting unit to generate one or more reports based on the stored data. The fourth machine learning model is trained with training data that has pairs of user input including queries and software tool specific commands and a corresponding desired output. The system can also include a bad actor detection unit for identifying instances of malicious behavior, based on one or more malicious criteria, and then triggering a mitigation action.

The present invention is also directed to a computer-implemented data access and risk management method comprising providing a first data isolation layer for isolating a user from a data source subsystem, the first data isolation layer employing a first machine learning model for processing input query data received from a query control unit and raw data received from the data source subsystem and for generating first output model data that includes query instructions as well as one or more responses to the input query data based on the input query data and the raw data; providing a second data isolation layer having a mapping and conversion unit for mapping metadata from the data source subsystem to the query instructions to form mapped query data and for converting the mapped query data into software tool specific command data corresponding to one or more software applications of the data source subsystem, wherein the command data corresponds to selected types of information from one or more selected data sources in the data source subsystem, wherein the mapping and conversion unit employs a second machine learning model for transforming and adapting the mapped query data into a format compatible with one or more target software tools associated with specific data sources in the data source subsystem; and providing a third data isolation layer having a risk mitigation engine for processing data access guideline data and data access policy data and for generating, based thereon, a set of recommendations for accessing the data in the data source subsystem, and a data access verification unit for receiving the software tool specific command data and the set of recommendations and for generating, based thereon, access verification data representative of a data access decision.

The method can also include training the first machine learning model with a text dataset having a word sequence as an input such that the model learns to predict a next word in the word sequence of the text dataset given a preceding word in the word sequence and given a context of the text dataset, and tuning the trained first machine learning model to perform one or more selected tasks by training the first machine learning model on a narrower text dataset and adjusting one or more tuning parameters to perform the selected task. The method further includes configuring the second machine learning model to convert the mapped query data into tool specific command data by encoding the mapped query data and then decoding the mapped query data to form the output command data using a transformer architecture, and training the second machine learning model with datasets having pairs of estimated input queries and corresponding software tool-specific commands associated with the data source subsystem to convert the mapped query data into the software tool specific command data. Still further, the data access verification unit can be configured to verify an identity of the user or software application requesting access to the data in the data source subsystem.

The method also includes controlling with an access control checker engine access to the data in the data source subsystem based on the software tool specific command data and the third model output data and for generating the access control decision, and configuring the access control checker engine to compare the third model output data with one or more user attributes of the user to determine whether the user access to the data in the data source subsystem is granted or denied. The method still further includes determining with a policy checker engine whether the software tool specific command data includes information requesting access to a selected data source in the data source subsystem and determining whether the access request is consistent with one or more data access policies forming part of the set of recommendations in the third model output data; and assessing and mitigating with a risk mitigation checker engine risks associated with data access by the user and verifying that a user data access request is consistent with a set of recommendations in the third model output data, and assigning a risk score to the user data access request.

BRIEF DESCRIPTION OF THE DRAWINGS

These and other features and advantages of the present invention will be more fully understood by reference to the following detailed description in conjunction with the attached drawings in which like reference numerals refer to like elements throughout the different views. The drawings illustrate principals of the invention and, although not to scale, show relative dimensions.

DETAILED DESCRIPTION OF THE INVENTION

Figure 1:
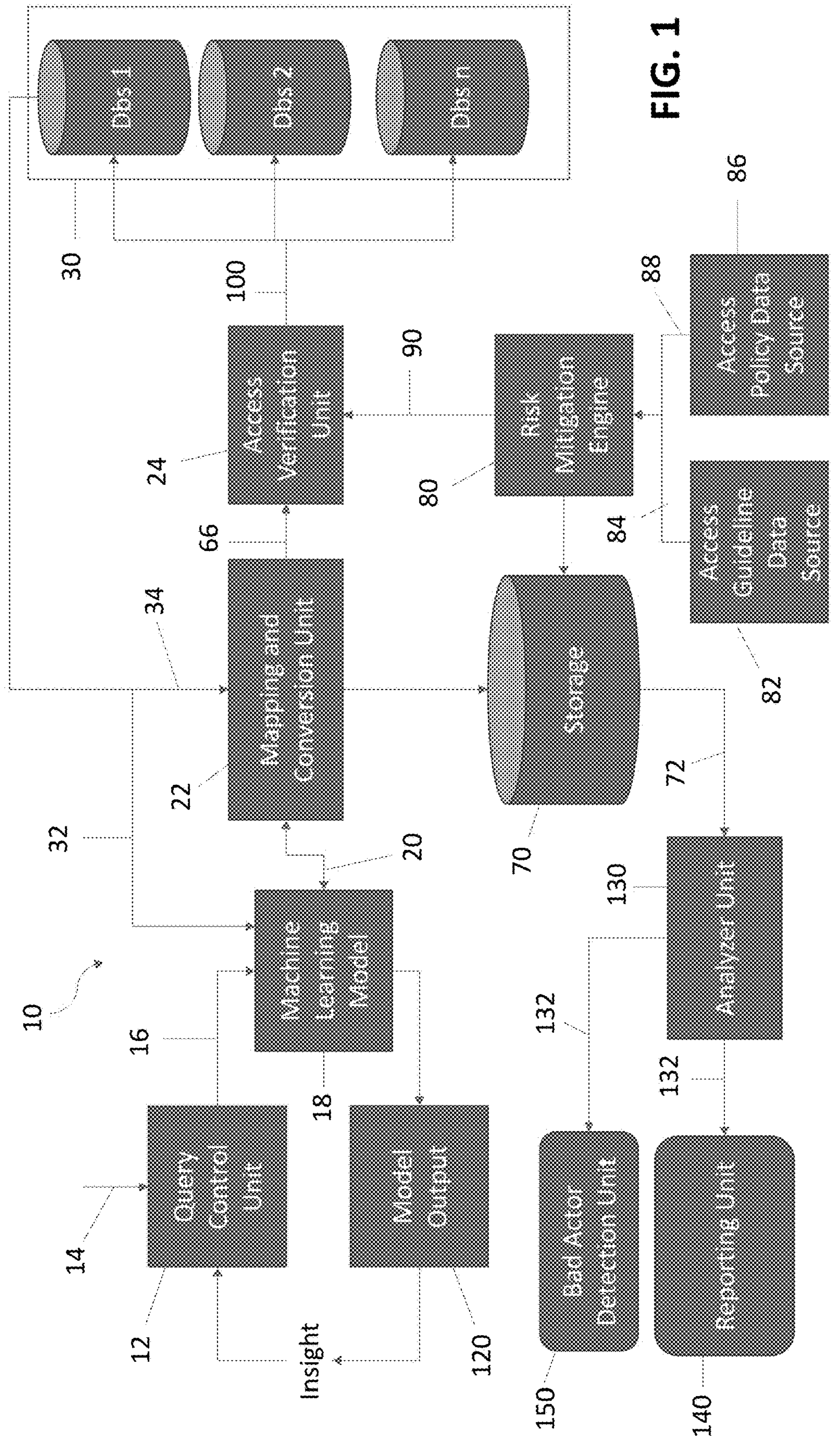
FIG. 1 is a schematic block diagram of the data access and risk management system according to the teachings of the present invention.

As used herein, the term "financial data" can include any data that is associated with or contains financial or financial related information. The financial information can include structured and unstructured data, such as information that is presented free form or in tabular formats, and is related to data associated with financial, monetary, or pecuniary interests. The financial data can oftentimes reside in or be extracted from enterprise resource planning (ERP) systems that are designed to aggregate financial as well as other types of data.

As used herein, the term "non-financial data" is intended to include data that is not financial in nature, and can include, for example, business related data, sales related data, human resource related data, customer or pricing related data, environmental related data, user related data, content related data, product related data, supply chain related data, workflow related data, operations related data, reporting related data, manufacturing related data, internet related data including social media information or other publicly available datasets (e.g., census, public government report data), and the like. The data can be in selected format or form, and can include structured and unstructured data, such as information that is presented free form or in tabular formats.

As used herein, the term "enterprise" is intended to include a structure or collection of structures (e.g., buildings), facility, business, company, operation, organization, country, or entity of any size. Further, the term is intended to include an individual or group of individuals, or a device of any type.

As used herein, the term "financial reports" is intended to include any statement or report that exists in any suitable format (e.g., printed or in digital file format) that sets forth or includes financial data, including, for example, tax returns, income statements, cash flow statements, balance sheets, 10-K statements, 10-Q statements, audit reports, annual reports, loan applications, credit history reports, invoices, and the like.

As used herein, the term "machine learning" or "machine learning technique" or "machine learning model" is intended to refer to the application of computational techniques that process and analyze data to enable computer systems to autonomously learn and improve their performance over time from the data, to automatically identify patterns, extract insights, and make informed decisions or predictions without explicit programming for each scenario. Machine learning models utilize statistical methods and optimization processes and techniques to adaptively refine their internal parameters, allowing them to generalize from past observations and efficiently solve complex tasks, including classification, regression, clustering, and more. The models can include supervised learning models (e.g., linear regression models, logistic regression models, decision tree models, random forest models, support vector models, neural network models), unsupervised learning models (e.g., K-Means clustering models, hierarchical clustering models, principal component analysis (PCA) models, gaussian mixture models (GMM)), semi-supervised learning models (e.g., a combination of supervised and unsupervised learning approaches where the model is trained on a partially labeled dataset), reinforcement learning models (e.g., agents and Q-learning and deep Q networks (DQNs)), deep learning models (e.g., neural networks), transfer learning models, ensemble learning models, on-line learning models, and instance-based learning models. The supervised learning models can be trained on labeled datasets to learn to map input data to desired output data or labels. This type of learning model can involve tasks like classification and regression. The unsupervised learning model involves models that analyze and identify patterns in unlabeled data. Clustering and dimensionality reduction are common tasks in unsupervised learning. The semi-supervised learning models combine elements of both supervised and unsupervised learning models, utilizing limited labeled data alongside larger amounts of unlabeled data to improve model performance. The reinforcement learning model involves training models to make sequential decisions by interacting with a selected environment. The models learn through trial and error, receiving feedback in the form of rewards or penalties. The deep learning models utilizes neural networks with multiple layers to automatically learn hierarchical features from data. The neural networks can include interconnected nodes, or "neurons," organized into layers. Each connection between neurons is assigned a weight that determines the strength of the signal being transmitted. By adjusting the weights based on input data and desired outcomes, neural networks can learn complex patterns and relationships within the data. The neural networks can include feedforward neural networks (FNNs), convolutional neural networks (CNNs), recurrent neural networks (RNNs), long short-term memory (LSTM) networks, gated recurrent units (GRUs), autoencoders, generative adversarial networks (GANs), transformers, and the like.

The transformer type model or architecture can be configured to process sequences of data, making the model particularly suitable for tasks involving natural language processing (NLP) or benefit from the processing using NLP. The transformer model can include a number of primary elements or components, including input embeddings, encoder and decoder stacks, self-attention and multi-head attention mechanisms, positional encoders, feedforward neural networks, normalization and residual connections, one or more output linear layers, and the like. During processing, input sequence can be divided into individual tokens, which can be words, subwords, or characters, based on the input data, which can include textual data. The input embeddings are an input sequence that is transformed into a series of embeddings, where each token is represented as and is mapped to a high-dimensional embedding vector, which captures positional information and the semantic meaning of the token. The embeddings can be a combination of learned token embeddings and positional encodings.

The encoder and decoder stacks can include multiple identical layers. The encoder stack when employed processes the input sequence, while the decoder stack when employed generates the output sequence in selected types of tasks, such as for example translation and other types of activities. The encoder stack can include a self-attention mechanism allows the model to weigh the importance of different tokens in the input sequence relative to a selected token, such as a query token. Each token can generate a plurality of vectors, including for example a query vector, a key vector, and a value vector. The attention score between a query and a vector key determines how much focus the model gives to the corresponding value when generating an output. The self-attention mechanism enables each word/token to consider all other words/tokens in the sequence while computing any associated representations. The self-attention mechanism captures dependencies and relationships between different words or portions of data regardless of the position of the data in the data sequence. Specifically, the self-attention mechanism allows the transformer model to weigh the importance of different elements or positions in the input sequence when making predictions and helps capture dependencies and relationships between words in the sequence. The encoder stack can also include a position-wise feed-forward network that consists of a fully connected layers and a non-linear activation function that can be independently applied to each position. The primary purpose of the position-wise feed-forward network is to introduce non-linearity and enable the model to capture complex interactions between different positions within the input sequence. The self-attention mechanism and the position-wise feed-forward network allow the model to capture both local and global dependencies within the input sequence.

The decoder stack can include, in addition to the above, can also include the attention mechanism for enabling the model to consider the context and relationships between different parts of the sequence (context-dependent information), making the model highly effective for capturing long-range dependencies in language. The decoder stack can also include a masked self-attention mechanism that ensures that each position can only attend to its preceding positions.

During training, the decoder can attend to positions before the current position to prevent information leakage from the future.

The model can also include the multi-head attention mechanism that can be configured to employ multiple sets of self-attention mechanisms in parallel, each mechanism focusing on a different aspect of the input sequence. The multiple attention heads capture different types of information, enabling the model to learn diverse patterns.

The model can also include an output layer that generates the final predictions or outputs based on the representations generated by the decoder stack. In selected types of tasks (e.g., machine translation), the output layer can produce a probability distribution over a target vocabulary for each position in the output sequence. Specifically, the final output of the decoder stack can be passed through the output linear layer to produce a probability distribution of the words/vocabulary for generating the next token. The transformer components cooperate or work together to capture long-range dependencies, effectively process sequential data, and easily perform natural language processing tasks. The positional encodings can be added to the embeddings to provide information about the position of each element in the sequence. This helps the model understand the order of the sequence. The encodings provide information about the relative positions of tokens in the sequence.

The transformer type machine learning model can involve training a model on one task and transferring the learned knowledge to a related task, often enhancing efficiency and performance. The model can be configured as an ensemble learning model that combines multiple models to make more accurate predictions. Common techniques include bagging and boosting.

An example of a transformer type machine learning model suitable for the system of the present invention can include, for example, large language models (LLMs). The large language models can be configured to understand and generate human language by learning patterns and relationships from vast amounts of input textual data. The model configuration can include setting selected hyperparameters, including the number of layers, hidden units per layer, attention mechanisms, and other architectural details. The LLMs can utilize deep learning techniques, particularly the foregoing transformer architectures, to process and generate text. The models can be pre-trained and trained on massive data corpora (e.g., text corpora, image corpora, and the like) and can perform tasks such as text generation, language translation, text summarization, image generation, sentiment analysis, and the like. The LLMs can include, by simple way of example, generative artificial intelligence (AI) or machine learning models. The generative artificial intelligence (AI) model refers to a computational system designed to create new and original data based on patterns and information learned from existing datasets. The generative AI model can employ selected machine learning techniques to generate content, such as text, images, audio, or other forms of media or data, that closely resembles the input data but is not an exact replication. The generative AI models can leverage neural networks and probabilistic methods to produce outputs that exhibit creativity and diversity while maintaining coherence with the input data distribution.

The large language models can be trained or pre-trained. The training and pre-training can involve a combination of data collection, data pre-processing, model architecture design, and optimization. For example, and by simple way of illustration, the model can process selected input data. The input data can include a diverse and extensive dataset of any type, such as image and text data. In the case of text data, the text data can be collected from a wide range of sources, such as books, websites, articles, and the like. The dataset can include text in multiple different languages and domains to ensure the model's versatility. The collected text data can be preprocessed to remove any noise, irrelevant information, or sensitive data. The text data can then be tokenized into smaller units, such as words or subwords, which the model can understand and process. The model can build a vocabulary by selecting a set of tokens from the tokenized input data, which can be used to represent words and subwords as numerical values. The model architecture can determine how the input data is processed. For example, the transformer type model can employ an encoder stack and a decoder stack. In the case of certain models, only the decoder stack need be employed in order to implement autoregressive language generation.

The model can be pre-trained on the input text data. During the pretraining step, the model learns to predict the next word in a sequence of text data given the preceding words in the sequence. As such, the model can be trained to learn and to capture or identify language patterns, grammar, and semantics, from the input data. The model can be configured and trained to predicts the next word by attending to the context words using the self-attention mechanism, which enables the model to consider different parts of the input text. The objective function used during pre-training is to determine the likelihood of the next word in the sequence given the context of the word. The model is trained so as to minimize, as best possible, the difference between the predicted word in the sequence and the actual next words in the training data. The model parameters cam be updated using optimization algorithms, such as stochastic gradient descent (SGD) or its variants. The process involves backpropagation to adjust the weights of the neural network layers.

After pre-training, the model can be further fine-tuned on specific tasks or domains. The tuning methodology involves training the model on a narrower dataset and adjusting any associated parameters so as to perform at a selected level on a desired task, such as translation, summarization, or question answering. The fine-tuning adapts the model to produce more contextually relevant and task-specific responses. The training process can also involve multiple iterations of pre-training and fine-tuning. With each iteration, the model's architecture, training techniques, and datasets can be refined and tuned to improve performance. Further, throughout the training process, the model is evaluated on validation datasets to monitor the performance of the model and to prevent overfitting. The evaluation metrics can include language generation quality, coherence, relevance, and task-specific metrics, depending on the intended use of the model.

The machine-learning processes as described herein can also be used to generate machine-learning models. A machine-learning model or model, as used herein, is a mathematical representation of a relationship between inputs and outputs, as generated using any machine-learning process including without limitation any process as described above and stored in memory. An input can be submitted to a machine-learning model once created, which generates an output based on the relationship that was derived. For example, a linear regression model, generated using a linear regression algorithm, may compute a linear combination of input data using coefficients derived during machine-learning processes to calculate an output datum. As a further non-limiting example, a machine-learning model may be generated by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

In the present disclosure, data used to train a machine learning model, such as a neural network, can include data containing correlations that a machine-learning process or technique may use to model relationships between two or more types or categories of data elements ("training data"). For instance, and without limitation, the training data may include a plurality of data entries or datasets (e.g., data entries that are related and organized in a structured manner), where each data entry represents a set of data elements that are recorded, received, and/or generated together. The data elements can be correlated by shared existence in a given data entry, such as by proximity in a given data entry, or the like. Multiple data entries in the training data may evince one or more trends in correlations between categories or types of data elements. For instance, and without limitation, a higher value of a first data element belonging to a first category or types of data element may tend to correlate to a higher value of a second data element belonging to a second category or type of data element, indicating a possible proportional or other mathematical relationship linking values belonging to the two categories. Multiple categories of data elements may be related in training data according to various correlations, and the correlations may indicate causative and/or predictive links between categories of data elements, which may be modeled as relationships such as mathematical relationships by the machine-learning processes as described herein. The training data may be formatted and/or organized by categories of data elements, for example by associating data elements with one or more descriptors corresponding to categories of data elements. As a non-limiting example, training data may include data entered in standardized forms by persons or processes, such that entry of a given data element in a given field in a given form may be mapped or correlated to one or more descriptors of categories. Elements in training data may be linked to descriptors of categories or types by tags, tokens, or other data elements. For example, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively, or additionally, the training data may include one or more data elements that are not categorized, that is, the training data may not be formatted or include descriptors for some elements of data. Machine-learning models or algorithms and/or other processes may sort the training data according to one or more categorizations using, for instance, natural language processing algorithms, tokenization, detection of correlated values in raw data and the like. The categories may be generated using correlation and/or other processing algorithms. The training data employed by the electronic device 300 can correlate any input data as described in this disclosure to any output data as described in this disclosure.

The term "application" or "software application" or "program" as used herein is intended to include or designate any type of procedural software application and associated software code which can be called or can call other such procedural calls or that can communicate with a user interface or access a data store. The software application can also include called functions, procedures, and/or methods.

The term "graphical user interface" or "user interface" as used herein refers to any software application or program, which is used to present data to an operator or end user via any selected hardware device, including a display screen, or which is used to acquire data from an operator or end user for display on the display screen. The interface can be a series or system of interactive visual components that can be executed by suitable software. The user interface can hence include screens, windows, frames, panes, forms, reports, pages, buttons, icons, objects, menus, tab elements, and other types of graphical elements that convey or display information, execute commands, and represent actions that can be taken by the user. The objects can remain static or can change or vary when the user interacts with them.

Figure 2:
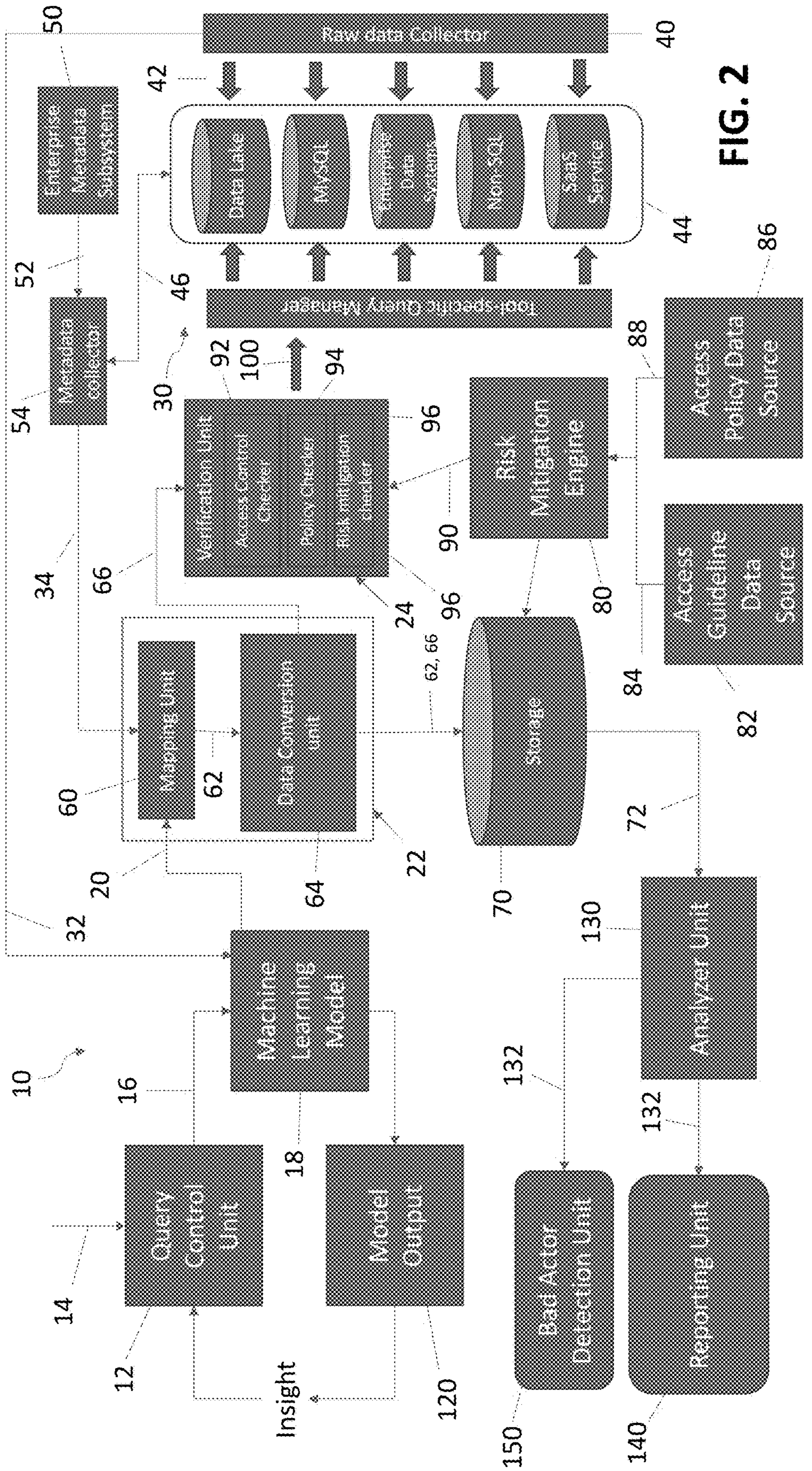
FIG. 2 is a schematic block diagram of the data access and risk management system of FIG. 1 showing details of the mapping and conversion unit and access verification unit according to the teachings of the present invention.
Figure 3:
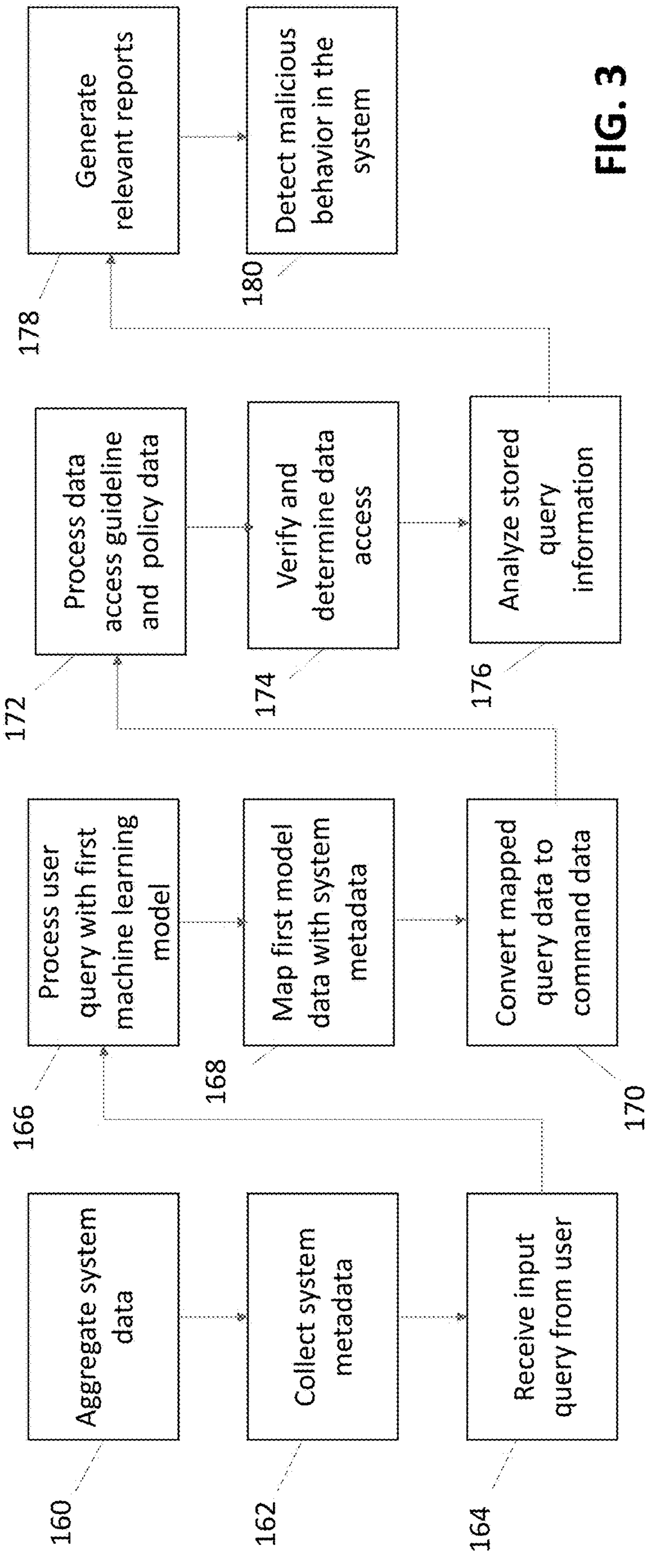
FIG. 3 is a schematic flow chart of the general operation and sequence of the data access and risk management system according to the teachings of the present invention.

The data access and risk management system of the present invention is shown for example in FIGS. 1 and 2. The illustrated data access and risk management system 10 employs multiple different data isolation layers employing machine learning models, including geo-location aware models that are highly context aware to the local region or geography, that help manage access to data while concomitantly forming a system that is self-aware of ways to manage data access risk depending upon the type of insight being requested from selected types of data sources, such as from enterprise data systems that contain important business data, including financial and non-financial data. The multiple different layers of machine learning models employed by the system helps isolate the system user from the sources of the data being requested by a system user, such that the user does not have direct access to the data sources. With the ability to use geo-location information including the ability to cognitively apply on-demand geo-fencing, access to data can be highly contextualized and made region specific. This data isolation architecture using multiple layered machine learning models helps preserve the integrity and the secrecy of the data sources as well as helps protect the data stored within the data sources from accidental or intentional alteration by the user.

The data access and risk management system 10 can include a query control unit 12 that enables a system user to create and generate queries or prompts that can be used by a machine learning model 18. The query control unit 12 serves as an interface between the system user and the remainder of the system, facilitating effective communication and content generation. The query control unit 12 can be configured to receive user queries (e.g., instructions) or prompts 14 that help guide the behavior of any selected machine learning models while concomitantly managing the output generated by the models to ensure that the output aligns with the user's intent and the desired output characteristics. The query control unit 12 can be configured to interface with the user, and as such, can include a number of optional features. Including a user interface, generated by a user interface generator, that can be configured and arranged to provide an intuitive and easy to use interface that allows the user to input instructions, prompts, or queries. The interface can be configured as a text box, voice input, or any other form of interface that enables the creation and capture of the input query 14. The query control unit 12 can also be optionally configured to parse and analyze the user queries. The query control unit 12 can analyze the queries 14 using, for example, natural language processing techniques to extract relevant information, context, and desired output specifications from the input query. The query 14 can be further analyzed by an optional contextual analyzer forming part of the query control unit 12 to determine the style, tone, subject matter, or any other relevant attributes of the query that should be incorporated into the generated output. Based on the parsed instructions and contextual analysis, the query control unit 12 can determine how the associated machine learning model 18 should behave. The query control unit 12 can optionally configure the parameters of one or more of the machine learning models 18, such as temperature and sampling strategy, to ensure the generated output is relevant and aligned with the input query. The query control unit 12 can also include one or more optional filters and moderation tools to ensure that the output generated by the machine learning models 18 adheres to related ethical and safety guidelines. Further, the query control unit 12 can be optionally configured to adaptively learn, based on user interactions and feedback, so as to be able to better understand user preferences and improve the parsing and contextual analysis capabilities of the unit. The query control unit 12 can interface with the machine learning model 18 so as to send the parsed and processed instructions (e.g., query data) while concomitantly receiving the generated model output 120, allowing the query control unit 12 to manage the output of the machine learning model 18. The query control unit 12 thus functions as an intermediate unit that bridges the gap between the user's intent and the machine learning model's capabilities, while optimizing the collaboration between the user and the machine intelligence, resulting in more accurate, relevant, and contextually appropriate generated content. The query control unit 12 can receive input data, such as user instructions or query 14, from the user.

The query control unit 12 can generate output query data 16 that can be conveyed to and received by the machine learning model 18. The query data 16 generated by the query control unit 12 can have any selected structure or format, and preferably is structured so as to be able to be processed by the machine learning model 18. The query data 16 can include any selected types of data, such text, images, audio, video, tabular data, hieroglyphs, or a combination thereof, depending on the capabilities and the architecture, function, and purpose of the machine learning model 18. In the current embodiment, the query data 16 includes textual data. The textual data can range from short phrases to complete sentences or paragraphs, depending on the complexity of the task to be performed. The query data 16 can optionally include, in addition to the textual data, selected types of metadata. The metadata can provide context, additional information, or constraints relevant to the task to be performed by the machine learning model 18. For instance, in a translation task, the metadata can specify the source and target languages. The query data 16 can also include labels or target values that the machine learning model aims to predict or classify. The query data can be optionally used during a training phase of the model to teach the model the correct textual associations. Along with the query data 16, the present embodiment can be configured to also inject into the context the geo information from where the query is originating and other region specific information, as well as restrictions that can further constrain and guide the machine learning models from a data access perspective.

The machine learning model 18 receives and processes the query data 16, which can include textual data and optional metadata. The machine learning model 18 can be any selected type of model, and according to one embodiment, can be configured as a transformer type machine learning model. The transformer type machine learning model can include one or more large language models. The machine learning model 18 can employ one or more neural networks that can be configured to tokenize the input textual data into smaller units, such as words or subwords. The tokens serve as the basic building blocks for the model's understanding of the input query data 16. Each token can then be mapped to a high-dimensional vector space using pre-trained word embeddings. The word embeddings can capture semantic relationships between words based on their co-occurrence patterns in the text data. As such, the tokens can be transformed into continuous numerical representations that the model can process. The model can also employ a positional encoder to add encodings to the embeddings. Positional encodings help the model understand the relative positions of tokens within the input textual sequence. The machine learning model 18 can also optionally include multiple layers of transformer blocks, each of which includes a self-attention mechanism that enables the model to weigh the importance of each token in the input sequence relative to the other tokens in the sequence. The self-attention mechanism aggregates contextual information from all of the tokens in the sequence, enabling the model to capture dependencies and relationships between different parts of the textual input. The tokens generated by the model are typically mapped back to human-readable text using a detokenization process or technique. The detokenization process involves reversing the tokenization process and converting numerical representations back into words or subword units. The machine learning model 18 can then generate first model output data 20.

The first model output data 20 can include query instructions in the form of a set of contextualized word embeddings for each word in the input query (e.g., query data 16). The word embeddings can represent the meaning of each word in the context of the entire query 14. More specifically, during processing of the query data 16, the machine learning model 18 generates for each word in the query 14 a high-dimensional vector known as an embedding. The embeddings capture the word's semantic meaning in light of surrounding words in the word sequence forming the query. The embeddings reflect how a word contributes to the meaning of the entire query. The model also considers the context of the entire query when generating word embeddings. As such, the same word can have different embeddings depending on the context. The self-attention mechanisms can help refine the embeddings. The generated embeddings can be used for various tasks, including providing relevant answers to the submitted query, matching the query with selected documents, and the like.

The metadata optionally forming part of the query data 16 can be passed along with the output of the machine learning model 18. Further, the metadata can be employed to influence the generation of the first model output data 20 directly or indirectly. For example, if the query data 16 includes information about the topic, style, or other contextual details, the machine learning model can use the information to generate more relevant and coherent responses. In some models, the metadata can instruct the model to generate content in a particular style, tone, or language, which can guide or control the behavior of the model during output generation. The metadata can also be used to guide the model to generate content that aligns with certain predefined attributes. Alternatively, the metadata can be appended to the first model output data 20 during post-processing by the model.

The machine learning model 18 can be pre-trained or trained on selected types of input data, including for example text data. According to the present invention, the machine learning model 18 can be trained on financial data and non-financial data. During the pretraining step, the machine learning model 18 learns to predict the next word in a sequence of text data given the preceding words in the sequence. As such, the model can be trained to learn and to capture or identify language patterns, grammar, and semantics, from the input data. The model can be configured and trained to predict the next word in a sequence of text by analyzing the context of the text. After pre-training, the machine learning model 18 can be further tuned or fine-tuned on specific tasks or domains. The tuning methodology can involve further training the model on a narrower dataset and adjusting any associated parameters so as to perform at a selected level on a desired task, such as translation, summarization, analysis, question answering, and the like. The fine-tuning adapts the model to produce more contextually relevant and task-specific responses. The training process can also involve multiple iterations of pre-training, training, and/or fine-tuning. The machine learning model 18 can further leverage geo-location information to cognitively apply on-demand geo-fencing, thereby making data access highly contextualized and region-specific. With each iteration, the model's architecture, training techniques, and datasets can be refined and tuned to improve performance.

The machine learning model 18 also receives the stored raw data 32 from the data source subsystem 30 of the enterprise. The raw data originates from the data sources in the data source subsystem 30 that contain data required or that needs to be accessed to provide a response to the user query 14. Specifically, the data access and risk management system 10 can include the data source subsystem 30 that collects, aggregates and stores data generated by the enterprise. The data can include financial data and non-financial data and can be stored in any suitable storage element, such as in databases (e.g., Dbs 1, Dbs, 2, Dbs n, Non-SQL, and the like), data lakes, enterprise resource systems, relational database management systems (e.g., MySQL), and the like. The data that is aggregated and stored in the data source subsystem 30 can be in any selected form or format, such as in structured and/or unstructured form. The data can also include metadata that is also collected and stored by the data source subsystem 30. Those of ordinary skill in the art will readily recognize that the data source subsystem 30 can be a distributed subsystem and the data can be stored at a number of separate locations. The aggregated data can be universally managed, or the management responsibilities can be distributed throughout the system. The output data 32 of the data source subsystem 30 can be conveyed to the machine learning model 18 and the metadata 34 of the enterprise stored in the data source subsystem can be conveyed to the mapping and conversion unit 22.

As shown in FIG. 2, the data source subsystem 30 can include a raw data collector 40. The raw data collector 40 can be configured to aggregate, ingest, and store unprocessed raw data, which can include unstructured, structured, or minimally processed data provided or extracted from different types of data sources in the enterprise. The raw data collector 40 aggregates the data in its original form (e.g., raw form) before any transformations, processing, or analysis occurs, thus preserving the integrity of the data. The raw data 42 can then be stored in selected types of storage elements forming part of a storage subsystem 44. The storage elements can be configured to store selected types of data from selected types of data sources. The storage elements can be optimized to incorporate geo-location tags, thereby enabling contextualization of data based on regional relevance and facilitating geo-fencing for secure access. The raw data 42 that is stored in the storage subsystem 44 can also include raw metadata 46.

The data source subsystem 30 can also include an enterprise metadata subsystem 50 that functions as a central centralized repository and management framework for storing, organizing, and providing access to metadata across the enterprise. The metadata provides context, structure, and meaning to the raw data 42 collected by the raw data collector 40 and generated by the enterprise. The enterprise metadata subsystem 50 helps enhance data governance, data management, and overall information management practices within the enterprise. The enterprise metadata subsystem 50 can output the collected metadata 52. The data source subsystem 30 can further include a metadata collector 54 that can be configured to aggregate or collect, store, and manage metadata from various data sources within the enterprise. According to the one embodiment, the metadata collector 54 can collect or aggregate the raw metadata 46 from the data storage subsystem 44 or can store the metadata from the enterprise metadata subsystem 50 in the storage subsystem 44. The metadata collector 54 can assist in centralizing, organizing, and making metadata accessible to users and to the system 10. The metadata collector 54 can be configured to collect, aggregate, or ingest metadata from various data sources, where the metadata can have differing formats, structures, and semantics. Additionally, the metadata collector 54 can incorporate geo-location information to enhance regional context-awareness and facilitate geo-fencing capabilities. As such, the metadata collector 54 can include suitable structure or processes to optionally map and transform the metadata into a common format or schema for consistency and ease of management. The metadata collector 54 can also be optionally configured to organize the metadata 46, 52 in a structured manner by creating relationships and linkages between different metadata elements. By simple way of example, the metadata collector 54 can be configured to link data sources to transformation processes, data dictionaries, business terms or rules, and the like.

With reference to FIGS. 1 and 2, the data source subsystem 30 can convey the metadata information 34 to the mapping and conversion unit 22 as well as convey the raw data 32 to the machine learning model 18. The mapping and conversion unit 22 can forma second data isolation layer for isolating the user from the data sources of the data source subsystem 30. The mapping and conversion unit 22 can be configured to receive the query data or instructions in the first model output data 20 as well as the metadata 34 from the metadata collector 54. The mapping and conversion unit 22 can thus function as a second data isolation layer that is formed between the data source subsystem 30 and the user by isolating the user from the specific data sources that is supplying the data. Consequently, the user does not directly access the raw data or the data sources or knows the source of the data, thus preserving the integrity and confidentiality of the data sources. The mapping and conversion unit 22 enables the query data to be converted into software application or tool specific commands that enable the retrieval of selected types of information from one or more data sources. The mapping and conversion unit 22 can map the metadata 34 to the query instructions in the first output model data as well as convert the mapped query data to tool-specific command data. Specifically, the mapping and conversion unit 22 can include a mapping unit 60 for mapping the metadata 34 to the query instructions or data in the first model output data 20. The mapping unit 60 can be configured to connect and associate metadata with the actual query data and optionally with the sources of the data in the data source subsystem 30 that include data relevant for answering the query in the query data. The mapping process enables the user to understand the context, meaning, and relationships of the queried data, thus enhancing data interpretation and analysis. The mapping unit 60 can employ predefined mapping rules or logic that define how the metadata 34 is associated with specific query data 20. For example, the mapping unit 60 can map the query data with the metadata based on any selected type of metadata parameters, such as for example column names, data types, data keys, data relationships, custom attributes, and the like. The query instructions can then be enriched with the mapped metadata. The enrichment process can include the use of additional columns, annotations, or attributes that can be added to the query data. The mapping unit 60 can then generate mapped query data 62.

The mapped query data 62 can then be conveyed to a data conversion unit 64. The data conversion unit 64 can employ one or more types of machine learning models that can be configured to convert the query data to tool or software specific data that can be used to bridge the gap between the type and format of the query data and the specific data format and structure required by a particular software application working in conjunction with a specific data source. To handle polyglot sources and programming languages, the data conversion unit 64 can leverage advanced techniques such as natural language processing (NLP) models for multilingual data, as well as code translation algorithms that dynamically interpret and translate queries across various programming languages. Additionally, it can incorporate context-aware embeddings and model architectures designed to understand and process diverse data formats and programming syntax efficiently. To handle polyglot sources and programming languages, the data conversion unit 64 can leverage advanced techniques such as natural language processing (NLP) models for multilingual data, as well as code translation algorithms that dynamically interpret and translate queries across various programming languages. Additionally, the data conversion unit 64 can incorporate context-aware embeddings and model architectures designed to understand and process diverse data formats and programming syntax efficiently. The software tools associated with or employed by the data access and risk management system 10 can include one or more software applications that serve a specific purpose or solve a particular problem. The software tool can be designed to perform efficiently a focused task or a set of tasks. The data conversion unit 64 thus allows the user to query the data access and risk management system 10 for specific answers without requiring the user to know the software or tool specific commands that are needed or necessary to retrieve the relevant information from selected data sources in the data source subsystem 30 that employ specific software applications or need to know the system location of the data sources.

The machine learning model employed by the data conversion unit 64 can automate the process of transforming and adapting the query into a format compatible with the target software tool. According to one embodiment, the data conversion unit 64 can employ a transformer type machine learning model for converting the query data to tool specific command data by encoding the input mapped query data and then decoding the output command using a transformer architecture. For example, the mapped query data 62 can be again tokenized by the model into individual words or subwords, and each token is mapped to its corresponding numerical identifier using a predefined vocabulary. The numerical identifiers can be passed through an embedding layer to obtain continuous vector representations for each token and to capture the semantic meaning of the tokens. The embedded tokens can then be passed through an encoder stack of the model architecture. The encoder stack can include multiple layers, each layer containing two sub-layers, namely, a multi-head self-attention sublayer and a position-wise feed-forward network sublayer. The multi-head self-attention sublayer enables the model to weigh the importance of each token in the mapped query data 62 relative to all the other tokens. This sublayer hence captures relationships between the words and helps understand the context of the words. The position-wise feed-forward network sublayer introduce non-linearity to the model and processes the outputs of the attention sublayer. The output of the encoder stack can be a contextualized representation of the input query and can be a combination of the original embeddings and the information learned through the attention and feed-forward sublayers. The contextualized representation captures the nuances and context of the mapped query data, which is crucial for generating accurate software-specific commands.

The decoder stack of the model architecture receives as an input the contextualized representation from the encoder and the previously generated tokens. The decoder stack can have multiple layers, each of which can include three or more sub-layers, namely, a masked multi-head self-attention sublayer, a multi-head attention over encoder outputs sublayer, and a position-wise feed-forward network sublayer. The masked multi-head self-attention sublayer ensures that the decoder processes only the tokens that have been generated, thus preventing the model from considering future tokens. The multi-head attention over encoder outputs sublayer enables the decoder stack to process the relevant parts of the mapped query data 62 (e.g., the contextualized representation) in order to generate accurate tool commands. The position-wise feed-forward network sublayer can add non-linearity to the tokens and process the outputs of the attention sublayers. During the decoding process, the model can generate one token at a time. At each decoding step, the decoder takes the previous tokens and the contextualized representation as input to predict the next token in the output command. Once the model has generated the software-specific commands, the data access and risk management system 10 can interpret and execute the command to retrieve the desired data based on the original query. The output of the model can thus include a sequence of tokens that are representative of the generated software command. In the current embodiment, the data conversion unit 64 can generate software specific command data 66. The command data 66 generated by the data conversion unit 64 can be stored in any suitable storage element. According to the illustrated embodiment, the command data 66 can be stored in a central database 70. The command data 66 can also be conveyed to an access verification unit 24 for determining whether the user has access permission or rights to the data in the data source subsystem 30.

The machine learning model in the data conversion unit 64 can be trained or pre-trained with query data datasets (e.g., a dataset containing pairs of input queries and metadata) and with software tool specific command datasets to convert the mapped query data 62 into software tool-specific command data 66. The training can involve initially preparing the training data, which can include datasets having pairs of estimated input queries and the corresponding software tool-specific commands associated with the data source subsystem 30. Each query-command pair can be accurately labeled as needed. The second machine learning model can preprocess the input data (e.g., training data) by tokenizing the training data into tokens, such as words or subwords. The model can also create a vocabulary from the tokenized data and map the tokens (e.g., words) to selected numerical identifiers. Optionally, the dataset can be divided into a training dataset, a validation dataset, and a test dataset. The model can be trained using the training dataset, where for each input query, the model can compute an estimated loss based on the predicted command and the actual command. Location-specific fine-tuning can be incorporated by adjusting the training datasets to include regional features and data patterns, enabling the model to provide more contextually relevant responses based on geographical information. Additionally, the memory tuning of mixture of experts can be employed, allowing the model to dynamically switch between specialized sub-models or experts that are fine-tuned for specific regional data characteristics or query types. The model can apply selected backpropagation and gradient descent to update any weights associated with the data. The model can then evaluate its performance using the validation dataset. The validation process can include determining or calculating selected metrics, such as a Bilingual Evaluation Understudy (BLEU) score or a Recall-Oriented Understudy for Gisting Evaluation (ROUGE) score to assess the quality of the generated commands. The BLEU and ROUGE scores can be employed to assess the quality of machine-generated text, such as machine translation, text summarization, and text generation tasks. The scores can provide a quantitative measure of how well the generated text matches a reference (human-written) text. The BLEU and ROUGE scores can be between 0 and 1, where a higher score indicates a better match and hence a higher quality match. One or more hyper parameters of the model can be tuned so as to optimize the performance of the model. The hyperparameters can include learning rate, batch size, number of layers, and model size. The validation metrics can be employed to guide the tuning process.

As shown in FIGS. 1 and 2, the data access and risk management system 10 can further include a risk mitigation engine 80. The risk mitigation engine 80 helps determine the data access rights and privileges of the user and the risks associated with granting access to the data based on selected types of data access information, such as policy and guideline information. The risk mitigation engine 80 also helps the enterprise manage and regulate how users, such as employees and authorized third parties, can access and interact with the data in the data source subsystem 30. The data access guidelines and policies can be created or provided to ensure data security, privacy, and compliance with relevant rules and regulations. According to one embodiment, the risk mitigation engine 80 can receive various types of data access information from one or more data access information data sources. The data access information can include guideline data and policy data. Furthermore, the risk mitigation engine 80 can incorporate geo-location information to apply region-specific access controls and evaluate risks contextually based on the user's location. This approach allows the engine to dynamically enforce geo-fencing policies, ensuring that access is both compliant and relevant to the local jurisdiction's regulations. For example, the data access and risk management system 10 can include, for example, an access guideline data source 82 that stores different types of guideline information for establishing the guidelines for accessing data in the data source subsystem 30. The guidelines and associated guideline data can refer to a set of principles and rules that govern the management, availability, usage and access of data associated with the enterprise. The guidelines can establish a framework for how data can be accessed, shared, and utilized by the users while ensuring confidentiality and compliance with legal and ethical standards.

The guidelines can set forth or define who has access rights to the data as well outlining the process for granting access to the data. The guidelines can also set forth the purposes for which the data can be accessed and used, as well as set forth the conditions under which the data can be shared with the user or other users. For example, the access guidelines data source 82 can include any selected type of access control or guideline information, including for example General Data Protection Regulation (GDPR) guideline information that refers to the process of creating and establishing guidelines that adhere to the requirements and principles of the GDPR. The GDPR is a comprehensive data protection and privacy regulation that applies to individuals within the European Union (EU) and the European Economic Area (EEA), as well as enterprises that process personal data. The guideline information ensures that the enterprise handles personal data in a transparent, secure, and lawful manner, and that individuals' rights and privacy are adequately protected. The guideline information in the access guideline data source 82 can also include California Consumer Privacy Act (CCPA) guideline information, which refers to the guidelines, regulations, and requirements established by the CCPA, a comprehensive data privacy law in the state of California, United States. The CCPA grants California consumers specific rights concerning their personal information and places obligations on businesses that collect, process, and share consumer data. The law is designed to enhance consumer privacy and provide individuals with more control over their personal data. The access guideline data source 82 can generate guideline data 84 that can be conveyed to the risk mitigation engine 80.

The risk mitigation engine 80 can also receive information from an access policy data source 86 that includes data or information associated with policies that enterprises establish to manage and regulate how user (e.g., employees and authorized third parties) access and interact with the system data. The policy data and associated policies can refer to a structured and predefined set of rules, permissions, and conditions that govern the authorized access, usage, and manipulation of data of the enterprise. The policies are created to maintain data security, integrity, and compliance while facilitating appropriate access to the data by authorized users. The policies can specify who is permitted to access specific types of data based on roles and responsibilities within the enterprise, and the policies can optionally adopt the principle of least privilege, where users are granted only the minimum access to the data necessary to perform their specified task. The policies can also optionally define user groups, identify individual users or system accounts that are granted access to the data. The policies can optionally classify the data according to data sensitivity levels, such as public, internal, confidential, and restricted. The policy can determine the appropriate access controls for each data classification. The access levels to the data can be defined based on job role or responsibility and the like. The policies can specify requirements for user authentication methods, such as strong passwords, multi-factor authentication (MFA), and single sign-on (SSO), and can set forth or identify the procedure for how users are authorized to access specific data in the data source subsystem 30. The policy can also establish a process for users to request access to specific data or resources and can establish an approval workflow involving appropriate managers or data owners before access is granted. The policies can also set forth detailed mechanisms for monitoring the data access and associated data activities, and can implement regular audits to track access patterns, identify anomalies, and investigate any suspicious activities. The policies can also include procedures for responding to data security incidents and breaches. The access policy data source 86 can generate policy data 88 that includes any of the foregoing policy information.

The policy data 88 and the guideline data 84 can be received and processed by the risk mitigation engine 80. The risk mitigation engine 80 can form part of a third data isolation layer for isolating the user still further from the data in the data source subsystem 30. The risk mitigation engine is configured for processing the guideline data 84 and the policy data 88 and to generate a set of recommendations or decisions regarding accessing the data in the data source subsystem 30. The recommendations can be derived from the analysis of both the guideline data 84 and the policy data 84. The risk mitigation engine 80 can be configured to assess the risk associated with each data access request based on a contextual analysis of the input data. The risk mitigation engine 80 evaluates factors such as the user's role, historical behavior, and the extent to which granting access adheres to the guideline and policies. After assessing the risk, the risk mitigation engine 80 generates the recommendations. The recommendations can be in the form of granting access, denying access, requesting additional authentication, requesting additional information, suggesting access with restrictions, or any other action that minimizes potential risk. The risk mitigation engine can also offer insights into why a particular recommendation was made. The insight can include for example, highlighting policy or guideline clauses, explaining risk factors, and demonstrating how the decision aligns with relevant regulations. The risk mitigation engine 80 thus strikes a balance between data accessibility and security, ensuring that data access decisions align with the policies and guidelines, and hence the business goals, of the enterprise while mitigating potential risks.

The risk mitigation engine 80 can employ one or more types of machine learning models, such as a transformer type machine learning model, to process the input data, which includes the guideline data 84 and the policy data 88. The risk mitigation engine 80 is configured for processing the guideline and policy data and for generating model output data 90, which can include the data access recommendations and insights. The output model data 90 can depend on the specific task or objective of the model. For example, in the current embodiment, the model can generate model data indicative of the policies and guidelines for users to access the data. Alternatively, or additionally, the model data can determine whether a given data access request or data use scenario complies with the specified policies and guidelines; the model data can provide recommendations based on the input policies and guidelines; the model data can assess the potential risks associated with specific data access or use scenarios based on the provided policies and guidelines; and the model data can be indicative of new data access policies or use guidelines based on input prompts, ensuring that they align with established standards and requirements. The machine learning model can be trained on the guideline and policy data from the respective data sources or on policy and guideline data from other enterprises.

With further reference to FIGS. 1 and 2, the data access and risk management system 10 of the present invention further includes an access verification unit 24 that controls, manages, and determines access to the data in the data source subsystem 30, and can be configured to verify the user and the user's access to the data. The access verification unit 24 can also form, along with the risk mitigation engine, part of the third data isolation layer of the present invention. Specifically, the access verification unit 24 receives and processes the software tool-specific command data 66 that includes the software tool command information and the model data 90 that includes one or more data access and risk mitigation recommendations, and preferably a set of recommendations, based on the guideline and policy information associated with data access, so as to ensure that the users or applications attempting to retrieve or manipulate data in the data source subsystem 30 have the necessary permissions and credentials to access and manipulate the data prior to access to the data being granted. The access verification unit 24 receives and processes, as input data, the software tool specific command data 66 from the mapping and conversion unit 22 and the set of recommendations (e.g., model data 90) from the risk mitigation engine 80. The integration and processing of the input data ensures that both the technical aspects of the data access request and the risk-based recommendations and insights are considered prior to access being granted to the data. The access verification unit 24 determines the users who are permitted to access specific types of business data based on selected access parameters, including for example user roles, user responsibilities, and the like. The access verification unit 24 thus generates a data access decision based on the input data. The data access decisions can include, for example, granting access to the data, denying access to the data, requesting additional information (e.g., additional authentication information), suggesting an alternative action, and the like. The access verification unit 24 thus generates as an output access verification data 100 that is representative of a data access decision regarding whether to grant or deny the requested user access to data in the data source subsystem 30 based on an analysis of the software tool specific command data 66 and the recommendations from the risk mitigation engine 80.

Further, the access verification unit 24 can be optionally configured to perform a selected number of additional functions, including for example verifying an identity of users or applications requesting access to the data, such as by requesting usernames, passwords, tokens, or other forms of authentication mechanisms. The access verification unit 24 can also be configured to check or confirm user access privileges to determine whether the user is allowed to perform the requested action on the specified data, and the access verification unit 24 can enforce access control policies based on predefined rules and roles. The access verification unit 24 thus functions as a data access gatekeeper or checker by preventing unauthorized access to data while concomitantly verifying and controlling access to the data.

According to one embodiment, the illustrated access verification unit 24 can include an optional access control checker engine 92 for controlling access to the data in the data source subsystem 30. The access verification unit 24 can process the software tool specific command data 66, which can include tool commands related to specific data sources in the data source subsystem 30 and compare the data source information with the access control information (e.g., model output 90) received from the risk mitigation engine 80. The access control checker engine 92 can then control the user's access to the data source subsystem 30 based on this comparison. Specifically, when the user attempts to access a specific data source or resource, the access control checker engine 92 can verify the identity of the user through selected verification techniques, such as authentication mechanisms including passwords, biometrics, or tokens. Once authenticated, the access control checker engine 92 can then proceed to determine whether the authenticated user has the necessary authorization to perform the requested action by requesting the requested data sources. The access control checker engine 92 can be configured to evaluate the access control policies and guidelines against one or more attributes of the user (e.g., user role or title, group membership, and the like), and can compare the attributes with the requirements defined in the policies to determine whether user access should be granted or denied (e.g., access control decision).

The access verification unit 24 can also optionally include a policy checker engine 94 for determining whether the software tool specific command data 66 includes information requesting access to a selected data source and determines whether the access request is consistent with the policy data associated with the enterprise or complies with selected policies associated with the enterprise. The policy checker engine 94 can be configured to evaluate access requests forming part of the command data 66 with a set of predefined policies forming part of the policy data present within the model data 90, so as to be able to determine whether the requested access is permissible (e.g., allowed or denied) and consistent with the data access policies of the enterprise. To further enhance data security and prevent fraud, the policy checker engine 94 can incorporate geolocation data to verify that access requests originate from authorized locations, thereby dynamically enforcing geofencing rules to mitigate fraudulent access attempts. Additionally, the policy checker engine 94 can factor in biometric identity verification, such as fingerprint or facial recognition data, attached to source documents to ensure that access is granted only to verified and authenticated users, thus preventing bad actors from unauthorized access. The policy checker engine 94 helps maintain data security, compliance, and overall system integrity. Thus, when the command data 66 includes tool commands associated with specific data sources, the policy checker engine 94 evaluates the access request against the set of defined policies in the policy data 88. The policy checker engine 94 thus analyzes various factors such as user attributes, resource attributes (e.g., sensitivity level, classification, and the like), and contextual information (e.g., time of day, location, and the like) to determine whether the access request aligns with the established data access policies. Based on the policy evaluation and matching process, the policy checker engine 94 generates a data access decision. If the access request aligns with the policies, the policy checker engine 94 grants access and allows the requested action to proceed. If the access request violates any policy conditions, then the policy checker engine 94 denies access to the data and prevents the action from taking place.

The access verification unit 24 can still further optionally include a risk mitigation checker engine 96 that can be configured to assess and mitigate potential risks associated with data access and usage by the user, and to ensure or verify that actions taken by the user align or are consistent with the set of recommendations in the third model output data 90. More specifically, the risk mitigation checker engine 96 can verify whether the user request is consistent with the risk management strategy, policies, and guidelines of the enterprise. The risk mitigation checker engine 96 helps to minimize the likelihood of data breaches, unauthorized disclosures, and other security incidents by evaluating the potential impact of access requests and enforcing appropriate measures to mitigate identified risks. The risk mitigation checker engine 96 begins by evaluating the risk associated with a particular data access request. The data access request forms part of the software tool specific command data 66, which can include tool command information associated with specific data sources. As such, the risk mitigation checker engine 96 can determine the risk associated with allowing access to the specified data sources. The data access assessment performed by the risk mitigation checker engine 96 can consider various factors, including the sensitivity of the data being accessed, the context of the access (such as the user's role, location, and the type of action being performed), and the potential consequences of unauthorized access or misuse. According to one embodiment, the risk mitigation checker engine 96 can be configured to generate and assign a risk score, risk level, or other indicia or risk, to the requested data access request. The risk score can quantify the potential impact and likelihood of negative outcomes if the data access were to be granted. The risk scores can involve numerical values, severity levels, or categories that help determine the seriousness of the identified risk. After evaluating the risk and determining the appropriate mitigation measures, the risk mitigation checker engine 96 can generate a data access decision. If the user data access request poses an acceptable level of risk (e.g., risk score above a threshold level) after applying mitigation measures, the request is granted, and the appropriate measures are enforced. If the risk level is deemed too high (e.g., risk score below a threshold level) even with mitigation, the request is denied.

The access verification unit 24 can generate access verification data 100 that can be conveyed to a data source manager 110. The data source manager 110 can be configured to facilitate efficient and effective interaction and communication between the access verification unit 24 and a software tool or application in the data source subsystem 30, such as a database or a file system or a specific data source. The data source manager 110 helps to simplify the process of querying and retrieving data from the data source subsystem 30, while also optimizing the query execution for better performance. The data source manager 110 can be configured to enhance the usability and productivity of the software tool by providing a user-friendly interface for crafting and executing queries against the data source. According to one embodiment, the data source manager 110 can be configured to parse and translate the user's query into a format that is compatible with the data sources (e.g., query language) used by the data source subsystem 30. The translation process ensures that the user's request is accurately represented in the query that can be executed against the data source. Once the query is parsed, translated, and optimized, the data source manager 110 submits the query to the data source subsystem for execution. The data source manager 110 can communicate with the storage subsystem 44 of the data source subsystem 30.

The data access and risk management system 10 provides for selected advantages. The system forms a series of data isolation layers between the user and the data source subsystem 30 for protecting the data within the subsystem and for checking and verifying that the user has the proper permissions to access the data. Further, the user is not provided direct access to the data source subsystem 30, thereby ensuring access control at the data source level.

Since the user can only retrieve selected data forming part of a response to an input query, the system of the present invention helps prevent the accidental proliferation of critical data into isolated, unmonitored end points within the enterprise.

The data access and risk management system 10 via the mapping and conversion unit 22 can convert the user query into tool specific command data enabling access to selected data sources. As such, the user is not required to understand or have the skill needed to generate the tool software code specific for accessing the data sources. The risk mitigation engine 80 also ensures that all the different business critical risks are consolidated in a selected location and processed by a dedicated risk mitigation engine.

Once the user is authenticated and verified by the access verification unit 24, and a data access decision has been generated, the data associated with the specified data sources that contains the requested raw data 32 can be conveyed to the input machine learning model 18. The machine learning model 18 can generate a response to the input user query by employing a selected responsive technique, such as for example a conditional text generation technique. Specifically, the machine learning model 18 processes both the input query 16 and the raw data 32 (e.g., additional context) and then generates a response to the user query 14 that considers both types of input information. As noted, the input query data 16 is tokenized by the machine learning model 18, and then each token is converted into a numerical representation of the query (i.e., embedding). The separate input raw data 32 provides additional context for generating the query response and is also tokenized and converted into numerical embeddings. The machine learning model 18 processes the tokenized representations of both the input query data 16 and the contextual raw data 32. The tokens can be processed together or separately depending upon the specific architecture of the model. Further, positional encodings are added to the embeddings to indicate the position of each token in the sequence. The embeddings are then passed through the model's encoding layers, which include self-attention mechanisms and feed-forward neural networks. The model processes the embeddings of both the input query and the raw data, capturing their relationships and interactions. The model generates response tokens and predicts the next token based on the previously generated tokens. At each step, the model uses the attention mechanisms to consider both the input query data 16 and the raw data 32. The initial to be generated by the machine learning model 18 can be post-processed to remove special tokens, to ensure grammatical correctness, and to enhance coherence. An access verification audit card can be generated and stored for every data access decision, containing comprehensive details of the decision-making process, including explainability and counterfactuals on whether access was granted or denied. The model 18 then generates model output 120 that is in essence a response to the input query 14 based on the separate raw data 32 that are contextually relevant and informed by the provided context, resulting in accurate and meaningful output. The model output 120 can include insights and predictions in addition to answers to the query.

Further, the storage element 70 can store and collect one or more of the query data 16, the mapped query data 62, and the tool specific command data 66 to form stored data 72. The stored query data enables the system or an administrator to review the specific queries, data sources, and tool commands that have been requested to be accessed by the user so as to provide a historical record of data requests, user activity, and data access decisions. The historical data access requests can be analyzed to determine prior data access requests, the users requesting data access, and the like.

The data access and risk management system 10 can further include an analyzer unit 130 that can be configured to analyze the data stored in the storage element 70. Specifically, the analyzer unit 130 receives and processes the stored data 72. The stored data can include one or more of the query data 16, the mapped query data 62, and the tool specific command data 66. The analyzer unit 130 can employ any type of machine learning model that can be trained to analyze the stored data 72, such as for example the query data (including mapped query data) and the command data that is stored in the storage element 70. According to one embodiment, the analyzer unit 130 receives the query data 20, 62 or the command data 66 as part of the stored data 72 and then processes and analyzes the received input data. The machine learning model can be trained and configured to analyze and interpret the query data and the command data, and then in response, generate informative and relevant outputs that can be utilized by the reporting unit 140 to generate suitable reports based on the processed data. The machine learning model, for example, can be configured to translate the user queries and tool commands into data-related instructions that can include, for example, the queries to selected data sources, aggregation or transformation commands that can be employed by the system to process the retrieved raw data 32, report specific output data including data mapping instructions that can be employed to align the input data with report structures of the reporting unit 140, and the like. In cases where the reports generated by the reporting unit 140 include visualizations, the model can generate as part of the model output data 132 report specific output data that can include instructions for generating graphs, charts, or diagrams based on the processed data. The instructions can include specifications for chart types, axes, data series, labels, and the like.

The model of the analyzer unit 130 can employ training data that can include pairs of user input (queries and commands) and the corresponding desired outputs (data and visualization instructions). The data can be used to train the model on how to interpret various user inputs and generate appropriate instructions for report generation.

The model output data 132 can also be processed by a bad actor detection unit 150 that can be configured to identify and flag entities or behaviors that are causing negative impacts, disruptions, anomalies, or violations within the system 10. The bad actor detection unit 150 can identify and mitigate instances of malicious or disruptive behavior or activities that can compromise the integrity, security, or effectiveness of the system. As used herein, the term "malicious behavior" or "malicious activities" is intended to refer to any intentional, unauthorized, or detrimental actions undertaken by an individual, application or entity with the intent to compromise the security, integrity, confidentiality, availability, or functionality of digital resources, data, or systems. The malicious behavior or activities can encompass a wide range of behaviors and activities including, but not limited to, unauthorized access, data exfiltration, system intrusion, unauthorized modifications, injection of malicious code, disruption of services, and any other actions that violate the established guidelines, policies, rules, or permissions governing the use and access of the protected digital assets of the system 10. As used herein, the term "bad actor" is intended to refer to an individual, application, entity, or process that engages in activities that are harmful, unauthorized, or contrary to the intended operation of the system. The bad actor detection unit 150 can also leverage geo-location data to monitor and analyze access patterns, identifying potentially fraudulent activities based on anomalous access locations. Additionally, the bad actor detection unit 150 can utilize biometric identity verification attached to source documents to ensure that only authenticated users gain access, thereby preventing unauthorized access by bad actors. Each suspected malicious activity will be documented in a comprehensive access verification audit card, detailing all relevant decisions, and providing explainability, including counterfactuals on the decision to grant or deny access.

The bad actor detection unit 150 can employ advanced algorithms, heuristics, and pattern recognition techniques to identify and distinguish malicious behavior from legitimate actions, thereby enabling the system to promptly respond and mitigate potential threats to the system, in real-time. The bad actor detection unit 150 is hence responsible for monitoring the system 10 and identifying the malicious behavior by analyzing patterns and identifying potential bad actors based on various malicious criteria. The malicious criteria can include detecting deviations from normal behavior, tracking user and system behaviors to identify patterns that match known bad behaviors, employing predefined rules and policies to detect specific known malicious activities, monitoring user access to sensitive data and resources to ensure that permissions are not being abused, detecting excessive resource usage, and the like. When the bad actor detection unit 150 monitors malicious criteria and based thereon identifies potential malicious behavior, the bad actor detection unit 150 can trigger various mitigation actions or detection events, such as generating alerts, blocking access to data or to the system, initiating security protocols, or notifying system administrators. The bad actor detection unit 150 can be configured to proactively prevent or mitigate the impact of malicious behavior before the behavior can cause significant damage to the system.

In the illustrated embodiment, the model output data 132 can be employed by the bad actor detection unit 150 to leverage the insights and predictions from the trained model to identify and flag potentially malicious behavior within the system. The bad actor detection unit 150 can employ a machine learning model that has been trained on preprocessed data to learn patterns of normal behavior in the system. The model can determine appropriate thresholds for classifying behaviors as normal or potentially malicious based on the model features extracted from the model. The relevant thresholds can be set through experimentation and validation. The bad actor detection unit 150 can continuously monitor the input data (e.g., the model output data 132) to determine, based on the data, if the detected behavior is normal or malicious. If the model features indicate potentially malicious behavior (e.g., high anomaly score, low confidence), the bad actor detection unit 150 can trigger a mitigation action or detection event, such as generating alerts, logging the event, and taking immediate actions to mitigate the threat, such as blocking the user's access or initiating a security protocol. The bad actor detection unit 150 can also be configured to log and report the detected incidents for further analysis.

The data access and risk management system 10 of the present invention can thus employ multiple data isolation layers that can be arranged, from a data processing perspective, in a serial manner so as to isolate the user and the input query 14 from the data stored in selected data sources of the storage subsystem 44. The storage subsystem 44 forms part of the data source subsystem 30.

In operation, the system can aggregate data, such as financial and non-financial data, and then store the aggregated data in the storage subsystem 44 of the data source subsystem 30, step 160. Similarly, the metadata of the system, such as from the enterprise metadata subsystem 50 can be aggregated or collected by the metadata collector 54, step 162. The metadata 34 from the metadata collector can be used by the mapping and conversion unit 22. When a user is interested in deriving an insight or prediction from system data or is interested in an answer to a specific business-related question, the user logs into the system 10 and can initially input into a query control unit 12 an input query 14, step 164. According to one embodiment, the user can issue a query inquiring about a particular business insight. For example, the user can be a member of a sales analytics team and be interested in knowing the top salesperson for the year, what specific marketing strategies have they used, and how they have leveraged various firm-provided resources to achieve success. The query control unit 12 receives the query 14 and, in response, creates and generates queries or prompts that can be used by the machine learning model 18, as well as by the remainder of the system 10. The query control unit 12 can thus function as an interface between the system user and remainder of the system, facilitating effective communication and content generation therebetween. The query control unit 12 can generate query data 16 that is conveyed to a first machine learning model 18. The query data 16 can include textual data and optionally metadata. The machine learning model can consume or ingest the query data 16 and process the data into fundamental query-based components forming part of the first model output data 20, step 166. The components of the first model output data 20 represent or indicate the data sources that need to be accessed to provide an answer to the input query 14. In the above example, the input query 14 may require access to a sales management system, a marketing database, and any other database that stores firm-provided resources relevant to the input query 14.

According to one embodiment, the machine learning model 18 can employ a transformer type model for processing the query data 16 from the query control unit 12. The machine learning model processes the query data and optionally the metadata in the input query 14 and generates first model output data 20 that is representative of the query data and the optional metadata. More specifically, the first model output data 20 can include contextualized word embeddings that are representative of the query data and optionally the metadata. The query control unit 12 and the machine learning model 18 can form part of a first data isolation layer that isolates the user from the data residing in the data source subsystem 30. More specifically, on the user interaction side, the user input query 14 can be processed (e.g., broken down) automatically by the machine learning model 18 to determine the data systems or sources in the data source subsystem 30 that need to be accessed to retrieve data that can provide a response to the input query. The first data isolation layer shields or isolates the user from having to know where or how the data is being collected or extracted from the underlying data sources. By isolating the user from the data sources, the data access and risk management system 10 of the present invention can protect the data sources from unwanted access, intrusion, and alteration. This isolation architecture employed by the data access and risk management system 10 helps protect important data systems from individuals, entities, or applications. The data access and risk management system 10 isolates the insight needed and generated by the machine learning model 18 from the user. Further, the system architecture of the present invention eliminates the need for the users to possess the requisite and specific technology skills to understand and learn how to access data, run analytics, and the like on the system data and associated system network elements and software (e.g., eliminates need to know SAP, Splunk, and Oracle based systems). The first isolation layer thus helps prevent the accidental and unwanted proliferation of business data away from the data source subsystem 30.

The first model output data 20 generated by the first machine learning model 18 can then be conveyed to the mapping and conversion unit 22. The mapping and conversion unit 22 maps the first model output data representative of the query data to system metadata 34 provided by the metadata collector 54. The mapping and conversion unit 22 can map the metadata 34 from the data source subsystem 30 to the query data in the first model output data as well as convert the mapped query data to tool-specific query data. Specifically, the mapping and conversion unit 22 can include the mapping unit 60 for mapping the first model output data 20 representative of the query data with the metadata 34 from the metadata collector 54, step 168. The mapping unit 60 can map the query data with the metadata based on any selected type of parameter, such as for example column names, data types, data keys, data relationships, custom attributes, and the like. The query data can then be enriched with the mapped metadata. The mapped query data 62 can then be processed by the data conversion unit 64. The data conversion unit 64 can employ one or more machine learning models that can be configured to convert the mapped query data 62 into tool or software specific data that can be used to bridge the gap between the type and format of the query data and the specific data format and structure required by a particular software application functioning as a data source in the data source subsystem 30, step 170. The data conversion unit 64 then generates software tool specific command data 66. The command data 66, along with the mapped query data 62 and the first model output data (model query data) can be stored in the storage system 70, and the software tool specific command data 66 can also be conveyed to the access verification unit 24. The mapping and conversion unit 22 can thus function as a second data isolation layer that is formed between the data source subsystem 30 and the user by isolating the user from the specific data sources that is supplying the data. Consequently, the user does not directly access the raw data 32 or the data sources of the data source subsystem 30 or knows the source of the data, thus preserving the integrity and confidentiality of the data and associated data sources.

The data access and risk management system 10 employs a risk mitigation engine 80 that received guideline data 84 from the data access guideline data source 82 and policy data 88 from a data access policy data source 86. The risk mitigation engine processes the policy data 88 and the guideline data 84 using a machine learning model (third machine learning model) and generates as part of the model data 90 a set of recommendations related to the data access decisions, step 172. The access verification unit 24 can be configured to control, manage, and determine access to the data in the data source subsystem 30, and can be configured to verify the user and the user's access to the data. Stated another way, before the user input query 14 is issued to the appropriate data source in the data source subsystem 30, one or more checks or verification procedures can be performed. The verification procedure ensures that the user has privileges or rights to access the insight that will be generated as part of the query. It also ensures that the data requested by the user complies with the various risk reduction and mitigation policies forming part of the guideline data 84 and the policy data 88. The access verification data can check the data access query against policies related for example to privacy, access control, corporate risk policy, and the like, and determine if the tool-centric query can be issued. The access verification unit 24 can also form, along with the risk mitigation engine 80, part of the third data isolation layer of the present invention. The access verification unit 24 ensures that the users or applications attempting to retrieve or manipulate data in the data source subsystem 30 have the necessary permissions and credentials to access and manipulate the data prior to access to the data being granted. The access verification unit 24 receives and processes, as input data, the software tool specific command data 66 from the mapping and conversion unit 22 and the set of recommendations (e.g., model data 90) from the risk mitigation engine 80. The access verification unit 24 determines the users who are permitted to access specific types of business data based on selected access parameters, and then generates a data access decision based on the input data, step 174. The access verification unit 24 generates as an output access verification data 100 that is representative of a data access decision regarding whether to grant or deny the requested user access to data in the data source subsystem 30 based on an analysis of the software tool specific command data 66 and the recommendations from the risk mitigation engine 80.

If the user query is deemed appropriate and the user identity is verified, the access verification unit 24 can generate a data access decision forming pat of the access verification data 100. If access to the data is granted, then the system convers the relevant raw data 32 to the first machine learning model 18, which in turn based on the input query 14 and the raw data 32 generates a response and any associated insights forming part of the model output 120.

The software tool specific command data 66 (e.g., tool-centric queries), the input query data, and the mapped query data can be conveyed to and stored in a storage element 70 (e.g., central database) that functions as a knowledge repository of the system where the user queries and associated tool-centric queries are stored. The stored data 72 can then be conveyed to an analyzer unit 130 that can be configured to analyze the data stored in the storage element 70. The stored data can include one or more of the query data 16, the mapped query data 62, and the tool specific command data 66. According to one embodiment, the analyzer unit 130 receives the query data 20, 62 and/or the command data 66 as part of the stored data 72 and then processes and analyzes the received input data. The analyzer unit 130 can employ a machine learning model that is trained and configured to analyze and interpret the query data and the command data, and then in response, generate informative and relevant outputs that can be utilized by the reporting unit 140 to generate suitable reports based on the processed data, step 178.

The analyzer unit 130 can generate model output data 132 can also be processed by a bad actor detection unit 150 that can be configured to identify and flag entities or behaviors that are causing negative impacts or disruptions within the data access and risk management system 10. The bad actor detection unit 150 can identify and mitigate instances of malicious behavior that can impact the integrity, security, and effectiveness of the system, step 180. The bad actor detection unit 150 can identify and distinguish malicious behavior from legitimate actions, thereby enabling the system to promptly respond and mitigate potential threats to the system. The bad actor detection unit 150 is hence responsible for monitoring the system 10 and identifying the malicious behavior by analyzing patterns and identifying potential bad actors based on various malicious criteria. When the bad actor detection unit 150 monitors malicious criteria and based thereon identifies potential malicious behavior, the bad actor detection unit 150 can trigger various mitigation actions or detection events, such as generating alerts, blocking access to data or to the system, initiating security protocols, or notifying system administrators. The bad actor detection unit 150 can be configured to proactively prevent or mitigate the impact of malicious behavior before the behavior can cause significant damage to the system.

Exemplary Hardware

It is to be understood that although the invention has been described above in terms of particular embodiments, the foregoing embodiments are provided as illustrative only and do not limit or define the scope of the invention. Various other embodiments, including but not limited to those described herein, are also within the scope of the claims. For example, elements, units, modules, tools, engines, and components described herein may be further divided into additional components or units or joined together to form fewer components or units for performing the same function.

Any of the functions disclosed herein may be implemented using means for performing those functions. Such means include, but are not limited to, any of the components or units disclosed herein, such as the electronic or computing device components described herein.

The techniques described above and below may be implemented, for example, in hardware, one or more computer programs tangibly stored on one or more computer-readable media, firmware, or any combination thereof. The techniques described above may be implemented in one or more computer programs executing on (or executable by) a programmable computer or electronic or computing device having any combination of any number of the following: a processor, a storage medium readable and/or writable by the processor (including, for example, volatile and non-volatile memory and/or storage elements and non-transitory mediums), an input device, an output device, a display, and the like. Program code may be applied to input entered using the input device to perform the functions described herein and to generate output using the output device.

The term computer, computing system, computer system, computing device, or electronic device, as used herein, can refer to any device that includes a processor and optionally a computer-readable memory capable of storing computer-readable instructions, and in which the processor can execute the computer-readable instructions in the memory. The terms computer system and computing system refer herein to a system containing one or more computing devices.

Embodiments of the present invention include features which are only possible and/or feasible to implement with the use of one or more electronic devices, processors, and/or other elements of a computer system. Such features are either impossible or highly impractical to implement mentally and/or manually. For example, embodiments of the present invention may operate on digital electronic processes which can only be created, stored, modified, processed, and transmitted by computing devices and other electronic devices. Such embodiments, therefore, address problems which are inherently computer-related and solve such problems using computer technology in ways which cannot be solved manually or mentally by humans.

Any claims herein which affirmatively require an electronic device, a computing device, a processor, a memory, storage, or similar computer-related elements, are intended to require such elements, and should not be interpreted as if such elements are not present in or required by such claims. Such claims are not intended, and should not be interpreted, to cover methods and/or systems which lack the recited computer-related elements. For example, any system or method claims herein which recite that the claimed method is performed by a computer, a processor, a memory, a storage device or element, and/or similar computer-related element, is intended to, and should only be interpreted to, encompass systems and methods which are performed by the recited computer-related element(s). Such a system and method claim should not be interpreted, for example, to encompass a system or method that is performed mentally or by hand (e.g., using pencil and paper). Similarly, any product or computer readable medium claim herein which recites that the claimed product includes a computer, an electronic device, a processor, a memory, a storage element, and/or similar computer-related element, is intended to, and should only be interpreted to, encompass products which include the recited computer-related element(s) or are executable on the recited or related elements. Such a product claim should not be interpreted, for example, to encompass a product that does not include the recited computer-related element(s) or are not able to be executed on the recited element.

Embodiments of the present invention solve one or more problems that are inherently rooted in computer technology. For example, embodiments of the present invention solve the problem of how to monitor, control and manage access to data in the data access and risk management system 10. There is no analog to this problem in the non-computer environment, nor is there an analog to the solutions disclosed herein in the non-computer environment.

Furthermore, embodiments of the present invention represent improvements to computer and communication technology itself. For example, the data access and risk management system 10 of the present can optionally employ one or more specially programmed or special purpose computers in an improved computer system, which may, for example, be implemented within a single computing device. Further, the data access and risk management system 10 of the present invention can be configured or implemented using one or more computing or electronic devices as described herein, such as a server, a computer, a processor, a memory, storage, and the like.

Each computer program within the scope of the claims may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random-access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; CD-ROMs; solid state device; and the like. Any of the foregoing may be supplemented by, or incorporated in, specially designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk or a separate disk. These elements can also be found in a conventional desktop or workstation computer or server as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

It should be appreciated that various concepts, systems, and methods described above can be implemented in any number of ways, as the disclosed concepts are not limited to any particular manner of implementation or system configuration. Examples of specific implementations and applications are discussed below and shown in FIG. 4 primarily for illustrative purposes and for providing or describing the operating environment of the system of the present invention. The system 10 and/or elements or units or engines thereof can employ one or more electronic or computing devices, such as one or more servers, clients, computers, laptops, smartphones and the like, that are networked together, or which are arranged so as to effectively communicate with each other. The network can be any type or form of network. The devices can be on the same network or on different networks. In some embodiments, the network system may include multiple, logically grouped servers. In one of these embodiments, the logical group of servers may be referred to as a server farm or a machine farm. In another of these embodiments, the servers may be geographically dispersed. The electronic devices can communicate through wired connections or through wireless connections. The clients can also be generally referred to as local machines, clients, client nodes, client machines, client computers, client devices, endpoints, or endpoint nodes. The servers can also be referred to herein as servers, server nodes, or remote machines. In some embodiments, a client has the capacity to function as both a client or client node seeking access to resources provided by a server or server node and as a server providing access to hosted resources for other clients. The clients can be any suitable electronic or computing device, including for example, a computer, a server, a smartphone, a smart electronic pad, a portable computer, and the like, such as the illustrated electronic or computing device 300. The system 10 or any associated units or components of the system 10 can employ one or more of the illustrated computing devices and can form a computing system. Further, the server may be a file server, application server, web server, proxy server, appliance, network appliance, gateway, gateway server, virtualization server, deployment server, SSL VPN server, or firewall, or any other suitable electronic or computing device, such as the electronic device 300. In one embodiment, the server may be referred to as a remote machine or a node. In another embodiment, a plurality of nodes may be in the path between any two communicating servers or clients. The data access and risk management system 10, which includes the query control unit 12, the machine learning model unit 18, the mapping and conversion unit 22, the risk mitigation engine 80, the access verification unit 24, the analyzer unit 130, and the bad actor detection unit 150, can be stored on or implemented by one or more of the electronic or computing devices described herein (e.g., clients or servers), and the hardware associated with the electronic devices, such as the processor or CPU and memory or storage described below and herein.

Figure 4:
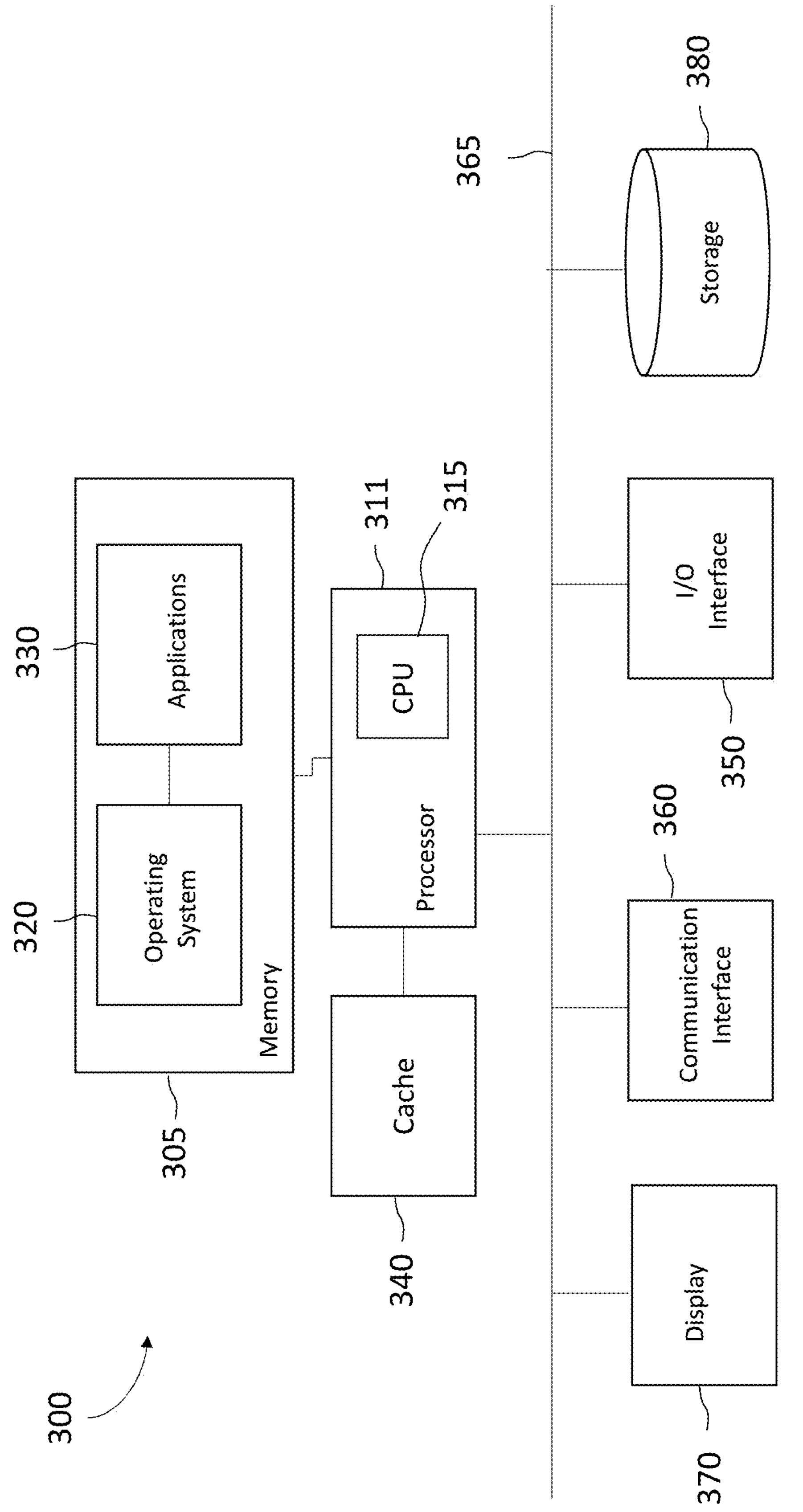
FIG. 4 is a schematic diagram of an electronic or computing device and/or associated system suitable for implementing the data access and risk management system of the present invention.

FIG. 4 is a high-level block diagram of an electronic or computing device 300 that can be used with the embodiments disclosed herein. Without limitation, the hardware, software, and techniques described herein can be implemented in digital electronic circuitry or in computer hardware that executes firmware, software, or combinations thereof. The implementation can include a computer program product (e.g., a non-transitory computer program tangibly embodied in a machine-readable storage device, for execution by, or to control the operation of, one or more data processing apparatuses, such as a programmable processor, one or more computers, one or more servers and the like).

The illustrated electronic device 300 can be any suitable electronic circuitry that includes a main memory unit 305 that is connected to a processor 311 having a CPU 315 and a cache unit 340 configured to store copies of the data from the most frequently used main memory 305. The electronic device can implement the process flow identification system 10 or one or more elements of the process flow identification system.

Further, the methods and procedures for carrying out the methods disclosed herein can be performed by one or more programmable processors executing a computer program to perform functions of the invention by operating on input data and generating output. Further, the methods and procedures disclosed herein can also be performed by, and the apparatus disclosed herein can be implemented as, special purpose logic circuitry, such as a FPGA (field programmable gate array) or an ASIC (application specific integrated circuit). Modules and units disclosed herein can also refer to portions of the computer program and/or the processor/special circuitry that implements that functionality.

The processor 311 is any logic circuitry that responds to, processes or manipulates instructions received from the main memory unit, and can be any suitable processor for execution of a computer program. For example, the processor 311 can be a general and/or special purpose microprocessor and/or a processor of a digital computer. The CPU 315 can be any suitable processing unit known in the art. For example, the CPU 315 can be a general and/or special purpose microprocessor, such as an application-specific instruction set processor, graphics processing unit, physics processing unit, digital signal processor, image processor, coprocessor, floating-point processor, network processor, and/or any other suitable processor that can be used in a digital computing circuitry. Alternatively, or additionally, the processor can comprise at least one of a multi-core processor and a front-end processor. Generally, the processor 311 can be embodied in any suitable manner. For example, the processor 311 can be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. Additionally, or alternatively, the processor 311 can be configured to execute instructions stored in the memory 305 or otherwise accessible to the processor 311. As such, whether configured by hardware or software methods, or by a combination thereof, the processor 311 can represent an entity (e.g., physically embodied in circuitry) capable of performing operations according to embodiments disclosed herein while configured accordingly. Thus, for example, when the processor 311 is embodied as an ASIC, FPGA or the like, the processor 311 can be specifically configured hardware for conducting the operations described herein. Alternatively, as another example, when the processor 311 is embodied as an executor of software instructions, the instructions can specifically configure the processor 311 to perform the operations described herein. In many embodiments, the central processing unit 530 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The processor can be configured to receive and execute instructions received from the main memory 305.

The electronic device 300 applicable to the hardware of the present invention can be based on any of these processors, or any other processor capable of operating as described herein. The central processing unit 315 may utilize instruction level parallelism, thread level parallelism, different levels of cache, and multi-core processors. A multi-core processor may include two or more processing units on a single computing component. Examples of multi-core processors include the AMD RYZEN series processors, and the INTEL CORE i5, i7, i9, X-series, H-series, U-series, and S-series processors.

The processor 311 and the CPU 315 can be configured to receive instructions and data from the main memory 305 (e.g., a read-only memory or a random-access memory or both) and execute the instructions. The instructions and other data can be stored in the main memory 305. The processor 311 and the main memory 305 can be included in or supplemented by special purpose logic circuitry. The main memory unit 305 can include one or more memory chips capable of storing data and allowing any storage location to be directly accessed by the processor 311. The main memory unit 305 may be volatile and faster than other memory in the electronic device, or can dynamic random access memory (DRAM) or any variants, including static random access memory (SRAM), Burst SRAM or Synch-Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 305 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 305 can be based on any of the above-described memory chips, or any other available memory chips capable of operating as described herein. In the embodiment shown in FIG. 4, the processor 311 communicates with main memory 305 via a system bus 365. The computer executable instructions of the present invention may be provided using any computer-readable media that is accessible by the computing or electronic device 300. Computer-readable media may include, for example, the computer memory or storage unit 305. The computer storage media may also include, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer readable storage media does not include communication media. Therefore, a computer storage or memory medium should not be interpreted to be a propagating signal per se or stated another transitory in nature. The propagated signals may be present in a computer storage media, but propagated signals per se are not examples of computer storage media, which is intended to be non-transitory. Although the computer memory or storage unit 305 is shown within the computing device 300 it will be appreciated that the storage may be distributed or located remotely and accessed via a network or other communication link.

The main memory 305 can comprise an operating system 320 that is configured to implement various operating system functions. For example, the operating system 320 can be responsible for controlling access to various devices, memory management, and/or implementing various functions of the asset management system disclosed herein. Generally, the operating system 320 can be any suitable system software that can manage computer hardware and software resources and provide common services for computer programs.

The main memory 305 can also hold application software 330. For example, the main memory 305 and application software 330 can include various computer executable instructions, application software, and data structures, such as computer executable instructions and data structures that implement various aspects of the embodiments described herein. For example, the main memory 305 and application software 330 can include computer executable instructions, application software, and data structures, such as computer executable instructions and data structures that implement various aspects of the content characterization systems disclosed herein, such as processing and capture of information. Generally, the functions performed by the content characterization systems disclosed herein can be implemented in digital electronic circuitry or in computer hardware that executes software, firmware, or combinations thereof. The implementation can be as a computer program product (e.g., a computer program tangibly embodied in a non-transitory machine-readable storage device) for execution by or to control the operation of a data processing apparatus (e.g., a computer, a programmable processor, or multiple computers). Generally, the program codes that can be used with the embodiments disclosed herein can be implemented and written in any form of programming language, including compiled or interpreted languages, and can be deployed in any form, including as a stand-alone program or as a component, module, subroutine, or other unit suitable for use in a computing environment. A computer program can be configured to be executed on a computer, or on multiple computers, at one site or distributed across multiple sites and interconnected by a communications network, such as the Internet.

The processor 311 can further be coupled to a database or data storage 380. The data storage 380 can be configured to store information and data relating to various functions and operations of the content characterization systems disclosed herein. For example, as detailed above, the data storage 380 can store information including but not limited to captured information, multimedia, processed information, and characterized content.

A wide variety of I/O devices may be present in or connected to the electronic device 300. For example, the electronic device can include a display 370, and as previously described, the visual application unit 28 or one or more other elements of the system 10 can include the display. The display 370 can be configured to display information and instructions received from the processor 311. Further, the display 370 can generally be any suitable display available in the art, for example a Liquid Crystal Display (LCD), a light emitting diode (LED) display, digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays, or electronic papers (e-ink) displays. Furthermore, the display 370 can be a smart and/or touch sensitive display that can receive instructions from a user and forwarded the received information to the processor 311. The input devices can also include user selection devices, such as keyboards, mice, trackpads, trackballs, touchpads, touch mice, multi-touch touchpads, touch mice and the like, as well as microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. The output devices can also include video displays, graphical displays, speakers, headphones, inkjet printers, laser printers, and 3D printers.

The electronic device 300 can also include an Input/Output (I/O) interface 350 that is configured to connect the processor 311 to various interfaces via an input/output (I/O) device interface 380. The device 300 can also include a communications interface 360 that is responsible for providing the circuitry 300 with a connection to a communications network (e.g., communications network 120). Transmission and reception of data and instructions can occur over the communications network.

The electronic or computing device 300 may be designed and/or configured to perform any method, method step, or sequence of method steps in any embodiment described in this disclosure, in any order and with any degree of repetition. For instance, electronic device 300 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. The electronic device 300 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

I claim:

1. A computer-implemented data access and risk management system, comprising a processor, and a non-transitory memory having instructions configuring the processor to:

form a first data isolation layer for isolating a user from a data source subsystem, the first data isolation layer employing a first machine learning model for processing input query data received from a query control unit and raw data received from the data source subsystem and for generating first output model data that includes query instructions as well as one or more responses to the input query data based on the input query data and the raw data, form a second data isolation layer having a mapping and conversion unit for mapping metadata from the data source subsystem to the query instructions to form mapped query data and for converting the mapped query data into software tool specific command data corresponding to one or more software applications of the data source subsystem, wherein the command data corresponds to selected types of information from one or more selected data sources in the data source subsystem, wherein the mapping and conversion unit employs a second machine learning model for transforming and adapting the mapped query data into a format compatible with one or more target software tools associated with specific data sources in the data source subsystem, and form a third data isolation layer having a risk mitigation engine configured to receive data access guideline data from an access guideline data source and data access policy data from an access policy data source, the risk mitigation engine having a third machine learning model for processing the data access guideline data and the data access policy data and for generating, based on an analysis of the data access guideline data and the data access policy data, third model output data representative of a set of recommendations for accessing data stored in in the data source subsystem, and a data access verification unit for receiving the software tool specific command data and the set of recommendations and for generating, based thereon, access verification data representative of a data access decision.

2. The computer-implemented system of claim 1, wherein the processor is configured to:

train the first machine learning model with a text dataset having a word sequence as an input such that the model learns to predict a next word in the word sequence of the text dataset given a preceding word in the word sequence and given a context of the text dataset, and tune the trained first machine learning model to perform one or more selected tasks by training the first machine learning model on a narrower text dataset and adjusting one or more tuning parameters to perform the selected task.

3. The computer-implemented system of claim 2, wherein the second machine learning model is configured to convert the mapped query data into tool specific command data by encoding the mapped query data and then decoding the mapped query data to form the output command data using a transformer architecture.

4. The computer-implemented system of claim 3, wherein each of the first machine learning model and the second machine learning model comprises a transformer type machine learning model.

5. The computer-implemented system of claim 4, wherein the processor is configured to train the second machine learning model with datasets having pairs of estimated input queries and corresponding software tool-specific commands associated with the data source subsystem to convert the mapped query data into the software tool specific command data.

6. The computer-implemented system of claim 5, wherein the data access decision includes one or more of granting access to the data, denying access to the data, requesting additional information, and suggesting an alternative action.

7. The computer-implemented system of claim 6, wherein the data access verification unit is configured to verify an identity of the user or software application requesting access to the data in the data source subsystem.

8. The computer-implemented system of claim 6, wherein the data access verification unit comprises an access control checker engine for controlling access to the data in the data source subsystem based on the software tool specific command data and the third model output data and for generating the access control decision.

9. The computer-implemented system of claim 8, wherein the access control checker engine is configured to compare the third model output data with one or more user attributes of the user to determine whether the user access to the data in the data source subsystem is granted or denied.

10. The computer-implemented system of claim 8, wherein the data access verification unit further comprises a policy checker engine for determining whether the software tool specific command data includes information requesting access to a selected data source in the data source subsystem and determines whether the access request is consistent with one or more data access policies forming part of the set of recommendations in the third model output data.

11. The computer-implemented system of claim 10, wherein the data access verification unit further comprises a risk mitigation checker engine that is configured to assess and mitigate potential risks associated with data access by the user and to verify that a user data access request is consistent with the set of recommendations in the third model output data.

12. The computer-implemented system of claim 11, wherein the risk mitigation checker engine is configured to assign a risk score to the user data access request.

13. The computer-implemented system of claim 12, further comprising a data source manager for receiving the access verification data and parsing and translating the access verification data into a format that is compatible with one or more of the data sources of the data source subsystem.

14. The computer-implemented system of claim 1, wherein the data source subsystem comprises a raw data collector for aggregating and storing raw data generated by the enterprise, a storage subsystem having a plurality of storage elements for storing the raw data, a metadata collector for collecting metadata generated by the enterprise, and a tool specific query manager.

15. The computer-implemented system of claim 14, wherein the metadata collector is configured to transform the metadata into a common schema and to organize the metadata in a structured manner by creating relationships and linkages between different elements of the metadata.

16. The computer-implemented system of claim 15, wherein the mapping and conversion unit comprises a mapping unit for mapping the metadata to the query instructions to form the mapped query data, and wherein the mapping unit is configured to:

employ predefined mapping rules for mapping the query instructions with the metadata based on one or more selected type of metadata parameters, and enrich the query instructions with the mapped metadata to form the mapped query data.

17. A computer-implemented data access and risk management method, comprising providing a first data isolation layer for isolating a user from a data source subsystem, the first data isolation layer employing a first machine learning model for processing input query data received from a query control unit and raw data received from the data source subsystem and for generating first output model data that includes query instructions as well as one or more responses to the input query data based on the input query data and the raw data, providing a second data isolation layer having a mapping and conversion unit for mapping metadata from the data source subsystem to the query instructions to form mapped query data and for converting the mapped query data into software tool specific command data corresponding to one or more software applications of the data source subsystem, wherein the command data corresponds to selected types of information from one or more selected data sources in the data source subsystem, wherein the mapping and conversion unit employs a second machine learning model for transforming and adapting the mapped query data into a format compatible with one or more target software tools associated with specific data sources in the data source subsystem, and providing a third data isolation layer having a risk mitigation engine configured to receive data access guideline data from an access guideline data source and data access policy data from an access policy data source, the risk mitigation engine having a third machine learning model for processing the data access guideline data and the data access policy data and for generating, based on an analysis of the data access guideline data and the data access policy data, a set of recommendations for accessing data stored in the data source subsystem, and a data access verification unit for receiving the software tool specific command data and the set of recommendations and for generating, based thereon, access verification data representative of a data access decision.

18. The computer-implemented method of claim 17, further comprising training the first machine learning model with a text dataset having a word sequence as an input such that the model learns to predict a next word in the word sequence of the text dataset given a preceding word in the word sequence and given a context of the text dataset, and tuning the trained first machine learning model to perform one or more selected tasks by training the first machine learning model on a narrower text dataset and adjusting one or more tuning parameters to perform the selected task.

19. The computer-implemented method of claim 18, further comprising configuring the second machine learning model to convert the mapped query data into tool specific command data by encoding the mapped query data and then decoding the mapped query data to form the output command data using a transformer architecture.

20. The computer-implemented method of claim 19, further comprising training the second machine learning model with datasets having pairs of estimated input queries and corresponding software tool-specific commands associated with the data source subsystem to convert the mapped query data into the software tool specific command data.

21. The computer-implemented method of claim 20, further comprising configuring the data access verification unit to verify an identity of the user or software application requesting access to the data in the data source subsystem.

22. The computer-implemented method of claim 21, further comprising controlling with an access control checker engine access to the data in the data source subsystem based on the software tool specific command data and the third model output data and for generating the access control decision, and configuring the access control checker engine to compare the third model output data with one or more user attributes of the user to determine whether the user access to the data in the data source subsystem is granted or denied.

23. The computer-implemented method of claim 22, further comprising determining with a policy checker engine whether the software tool specific command data includes information requesting access to a selected data source in the data source subsystem and determining whether the access request is consistent with one or more data access policies forming part of the set of recommendations in the third model output data.

24. The computer-implemented method of claim 23, further comprising assessing and mitigating with a risk mitigation checker engine risks associated with data access by the user and verifying that a user data access request is consistent with a set of recommendations in the third model output data, and assigning a risk score to the user data access request.

* * * * *